(12) United States Patent
Snow

(10) Patent No.: US 12,008,015 B2
(45) Date of Patent: *Jun. 11, 2024

(54) IMPORT AND EXPORT IN BLOCKCHAIN ENVIRONMENTS

(71) Applicant: Inveniam Capital Partners, Inc., New York, NY (US)

(72) Inventor: Paul Snow, Austin, TX (US)

(73) Assignee: Inveniam Capital Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,668

(22) Filed: May 24, 2022

(65) Prior Publication Data

US 2022/0284038 A1 Sep. 8, 2022

Related U.S. Application Data

(63) Continuation of application No. 16/905,947, filed on Jun. 19, 2020, now Pat. No. 11,347,769, which is a
(Continued)

(51) Int. Cl.
*G06F 16/27* (2019.01)
*G06F 9/455* (2018.01)
(Continued)

(52) U.S. Cl.
CPC .......... *G06F 16/27* (2019.01); *G06F 9/45558* (2013.01); *G06F 16/1805* (2019.01);
(Continued)

(58) Field of Classification Search
CPC .. G06F 16/27; G06F 16/1805; G06F 9/45558; G06F 9/4494; G06F 9/44505;
(Continued)

(56) References Cited

U.S. PATENT DOCUMENTS

| 4,309,569 A | 1/1982 | Merkle |
| 5,499,294 A | 3/1996 | Friedman |

(Continued)

FOREIGN PATENT DOCUMENTS

| CN | 107392618 A | 11/2017 |
| CN | 110392052 A | 10/2019 |

(Continued)

OTHER PUBLICATIONS

"Money in programmable applications: Cross-sector perspectives from the German economy", Deutsche Bundesbank Eurosystem, https://www.bundesbank.de, 18 pages, 2020.

(Continued)

*Primary Examiner* — Mohammed Waliullah
(74) *Attorney, Agent, or Firm* — Koffsky Schwalb LLLC

(57) ABSTRACT

Importation and exportation allows software services in blockchain environments. Blockchains may import data and export data, thus allowing blockchains to offer software services to clients (such as other blockchains). Individual users, businesses, and governments may create their own blockchains and subcontract or outsource operations to other blockchains. Moreover, the software services provided by blockchains may be publically ledgered by still other blockchains, thus providing two-way blockchain interactions and two-way ledgering for improved record keeping.

20 Claims, 29 Drawing Sheets

Related U.S. Application Data continuation of application No. 15/983,612, filed on May 18, 2018, now Pat. No. 10,783,164.

(51) Int. Cl.
  *G06F 16/18* (2019.01)
  *G06Q 20/06* (2012.01)
  *G06Q 20/38* (2012.01)
  *G06Q 20/40* (2012.01)
  *H04L 9/00* (2022.01)
  *H04L 9/06* (2006.01)

(52) U.S. Cl.
  CPC ......... *G06Q 20/065* (2013.01); *G06Q 20/382* (2013.01); *G06Q 20/401* (2013.01); *H04L 9/0643* (2013.01); *H04L 9/50* (2022.05); *H04L 2209/56* (2013.01)

(58) Field of Classification Search
  CPC . G06F 9/5005; H04L 9/0643; H04L 2209/56; H04L 2209/38; H04L 9/3239; G06Q 20/401; G06Q 20/065; G06Q 20/382
  See application file for complete search history.

(56) References Cited

U.S. PATENT DOCUMENTS

| | | |
|---|---|---|
| 5,606,609 A | 2/1997 | Houser |
| 5,862,218 A | 1/1999 | Steinberg |
| 5,920,629 A | 7/1999 | Rosen |
| 5,966,446 A | 10/1999 | Davis |
| 6,363,481 B1 | 3/2002 | Hardjono |
| 7,028,263 B2 | 4/2006 | Maguire |
| 7,212,808 B2 | 5/2007 | Engstrom |
| 7,272,179 B2 | 9/2007 | Siemens |
| 7,572,179 B2 | 8/2009 | Choi |
| 7,729,950 B2 | 6/2010 | Mendizabal |
| 7,730,113 B1 | 6/2010 | Payette |
| 8,245,038 B2 | 8/2012 | Golle |
| 8,266,439 B2 | 9/2012 | Haber |
| 8,359,361 B2 | 1/2013 | Thornton |
| 8,442,903 B2 | 5/2013 | Zadoorian |
| 8,560,722 B2 | 10/2013 | Gates |
| 8,612,477 B2 | 12/2013 | Becker |
| 8,706,616 B1 | 4/2014 | Flynn |
| 8,712,887 B2 | 4/2014 | Degroeve |
| 8,867,741 B2 | 10/2014 | McCorkindale |
| 8,943,332 B2 | 1/2015 | Horne |
| 8,990,322 B2 | 3/2015 | Cai |
| 9,124,423 B2 | 9/2015 | Jennas, II |
| 9,378,343 B1 | 6/2016 | David |
| 9,396,006 B2 | 7/2016 | Kundu |
| 9,398,018 B2 | 7/2016 | MacGregor |
| 9,407,431 B2 | 8/2016 | Bellare |
| 9,411,524 B2 | 8/2016 | O'Hare |
| 9,411,976 B2 | 8/2016 | Irvine |
| 9,411,982 B1 | 8/2016 | Dippenaar |
| 9,424,576 B2 | 8/2016 | Vandervort |
| 9,436,923 B1 | 9/2016 | Sriram |
| 9,436,935 B2 | 9/2016 | Hudon |
| 9,472,069 B2 | 10/2016 | Roskowski |
| 9,489,827 B2 | 11/2016 | Quinn |
| 9,584,493 B1 | 2/2017 | Leavy |
| 9,588,790 B1 | 3/2017 | Wagner |
| 9,647,977 B2 | 5/2017 | Levasseur |
| 9,722,790 B2 | 8/2017 | Ebrahimi |
| 9,818,109 B2 | 11/2017 | Loh |
| 9,830,580 B2 | 11/2017 | MacGregor |
| 9,875,510 B1 | 1/2018 | Kasper |
| 9,876,646 B2 | 1/2018 | Ebrahimi |
| 9,882,918 B1 | 1/2018 | Ford |
| 10,025,941 B1 | 7/2018 | Griffin |
| 10,046,228 B2 | 8/2018 | Tran |
| 10,102,265 B1 | 10/2018 | Madisetti |
| 10,102,526 B1 | 10/2018 | Madisetti |
| 10,108,954 B2 | 10/2018 | Dunlevy |
| 10,135,607 B1 | 11/2018 | Roets |
| 10,163,080 B2 | 12/2018 | Chow |
| 10,270,599 B2 | 4/2019 | Nadeau |
| 10,346,815 B2 | 7/2019 | Glover |
| 10,355,869 B2 | 7/2019 | Bisti |
| 10,366,204 B2 | 7/2019 | Tanner, Jr. |
| 10,373,129 B1 | 8/2019 | James |
| 10,411,897 B2 | 9/2019 | Paolini-Subramanya |
| 10,419,225 B2 | 9/2019 | Deery |
| 10,438,285 B1 | 10/2019 | Konstantinides |
| 10,476,847 B1 | 11/2019 | Smith |
| 10,532,268 B2 | 1/2020 | Tran |
| 10,586,270 B2 | 3/2020 | Reddy |
| 10,628,268 B1 | 4/2020 | Baruch |
| 10,685,399 B2 | 6/2020 | Snow |
| 10,693,652 B2 | 6/2020 | Nadeau |
| 10,749,848 B2 | 8/2020 | Voell |
| 10,764,752 B1 | 9/2020 | Avetisov |
| 10,783,164 B2 | 9/2020 | Snow |
| 10,817,873 B2 | 10/2020 | Paolini-Subramanya |
| 10,826,685 B1 | 11/2020 | Campagna |
| 10,855,446 B2 | 12/2020 | Ow |
| 10,873,457 B1 | 12/2020 | Beaudoin |
| 10,915,895 B1 | 2/2021 | Fogg |
| 10,929,842 B1 | 2/2021 | Arvanaghi |
| 10,949,926 B1 | 3/2021 | Call |
| 10,956,973 B1 | 3/2021 | Chang |
| 10,958,418 B2 | 3/2021 | Ajoy |
| 10,997,159 B2 | 5/2021 | Iwama |
| 11,042,871 B2 | 6/2021 | Snow |
| 11,044,095 B2 | 6/2021 | Lynde |
| 11,044,097 B2 | 6/2021 | Snow |
| 11,044,100 B2 | 6/2021 | Deery |
| 11,063,770 B1 | 7/2021 | Peng |
| 11,075,744 B2 | 7/2021 | Tormasov |
| 11,093,933 B1 | 8/2021 | Peng |
| 11,134,120 B2 | 9/2021 | Snow |
| 11,164,250 B2 | 11/2021 | Snow |
| 11,164,254 B1 | 11/2021 | Gordon, III |
| 11,170,366 B2 | 11/2021 | Snow |
| 11,171,782 B2 | 11/2021 | Tang |
| 11,205,172 B2 | 12/2021 | Snow |
| 11,276,056 B2 | 3/2022 | Snow |
| 11,295,296 B2 | 4/2022 | Snow |
| 11,296,889 B2 | 4/2022 | Snow |
| 11,328,290 B2 | 5/2022 | Snow |
| 11,334,874 B2 | 5/2022 | Snow |
| 11,347,769 B2 | 5/2022 | Snow |
| 11,348,097 B2 | 5/2022 | Snow |
| 11,348,098 B2 | 5/2022 | Snow |
| 11,423,398 B1 | 8/2022 | Mullins |
| 2001/0029482 A1 | 10/2001 | Tealdi |
| 2003/0018563 A1 | 1/2003 | Kilgour |
| 2004/0085445 A1 | 5/2004 | Park |
| 2005/0206741 A1 | 9/2005 | Raber |
| 2006/0075228 A1 | 4/2006 | Black |
| 2006/0184443 A1 | 8/2006 | Erez |
| 2007/0027787 A1 | 2/2007 | Tripp |
| 2007/0094272 A1 | 4/2007 | Yeh |
| 2007/0174630 A1 | 7/2007 | Shannon |
| 2007/0296817 A1 | 12/2007 | Ebrahimi |
| 2008/0010466 A1 | 1/2008 | Hopper |
| 2008/0028439 A1 | 1/2008 | Shevade |
| 2008/0059726 A1 | 3/2008 | Rozas |
| 2009/0025063 A1 | 1/2009 | Thomas |
| 2009/0287597 A1 | 11/2009 | Bahar |
| 2010/0049966 A1 | 2/2010 | Kato |
| 2010/0058476 A1 | 3/2010 | Isoda |
| 2010/0161459 A1 | 6/2010 | Kass |
| 2010/0228798 A1 | 9/2010 | Kodama |
| 2010/0241537 A1 | 9/2010 | Kass |
| 2011/0061092 A1 | 3/2011 | Bailloeul |
| 2011/0161674 A1 | 6/2011 | Ming |
| 2012/0203670 A1 | 8/2012 | Piersol |
| 2012/0264520 A1 | 10/2012 | Marsland |
| 2013/0142323 A1 | 6/2013 | Chiarella |
| 2013/0222587 A1 | 8/2013 | Roskowski |
| 2013/0275765 A1 | 10/2013 | Lay |

(56) References Cited

U.S. PATENT DOCUMENTS

| | | |
|---|---|---|
| 2013/0276058 A1 | 10/2013 | Buldas |
| 2014/0022973 A1 | 1/2014 | Kopikare |
| 2014/0201541 A1 | 7/2014 | Paul |
| 2014/0229738 A1 | 8/2014 | Sato |
| 2014/0282852 A1 | 9/2014 | Vestevich |
| 2014/0289802 A1 | 9/2014 | Lee |
| 2014/0297447 A1 | 10/2014 | O'Brien |
| 2014/0344015 A1 | 11/2014 | Puértolas-Montañés |
| 2015/0052615 A1 | 2/2015 | Gault |
| 2015/0193633 A1 | 7/2015 | Chida |
| 2015/0206106 A1 | 7/2015 | Yago |
| 2015/0242835 A1 | 8/2015 | Vaughan |
| 2015/0244729 A1 | 8/2015 | Mao |
| 2015/0309831 A1 | 10/2015 | Powers |
| 2015/0332256 A1 | 11/2015 | Minor |
| 2015/0363769 A1 | 12/2015 | Ronca |
| 2015/0378627 A1 | 12/2015 | Kitazawa |
| 2015/0379484 A1 | 12/2015 | McCarthy |
| 2016/0002923 A1 | 1/2016 | Alobily |
| 2016/0012240 A1 | 1/2016 | Smith |
| 2016/0021743 A1 | 1/2016 | Pai |
| 2016/0071096 A1 | 3/2016 | Rosca |
| 2016/0098578 A1 | 4/2016 | Hincker |
| 2016/0119134 A1 | 4/2016 | Hakoda |
| 2016/0148198 A1 | 5/2016 | Kelley |
| 2016/0162897 A1 | 6/2016 | Feeney |
| 2016/0217436 A1 | 7/2016 | Brama |
| 2016/0239653 A1 | 8/2016 | Loughlin-McHugh |
| 2016/0253663 A1 | 9/2016 | Clark |
| 2016/0260091 A1 | 9/2016 | Tobias |
| 2016/0267472 A1 | 9/2016 | Lingham |
| 2016/0267558 A1 | 9/2016 | Bonnell |
| 2016/0275294 A1 | 9/2016 | Irvine |
| 2016/0283920 A1 | 9/2016 | Fisher |
| 2016/0292396 A1 | 10/2016 | Akerwall |
| 2016/0292672 A1 | 10/2016 | Fay |
| 2016/0292680 A1 | 10/2016 | Wilson, Jr. |
| 2016/0294783 A1 | 10/2016 | Piqueras Jover |
| 2016/0300200 A1 | 10/2016 | Brown |
| 2016/0300234 A1 | 10/2016 | Moss-Pultz |
| 2016/0321675 A1 | 11/2016 | McCoy |
| 2016/0321751 A1 | 11/2016 | Creighton, IV |
| 2016/0321769 A1 | 11/2016 | McCoy |
| 2016/0328791 A1 | 11/2016 | Parsells |
| 2016/0330031 A1 | 11/2016 | Drego |
| 2016/0330244 A1 | 11/2016 | Denton |
| 2016/0337119 A1 | 11/2016 | Hosaka |
| 2016/0342977 A1 | 11/2016 | Lam |
| 2016/0342989 A1 | 11/2016 | Davis |
| 2016/0344737 A1 | 11/2016 | Anton |
| 2016/0371771 A1 | 12/2016 | Serrano |
| 2017/0000613 A1 | 1/2017 | Lerf |
| 2017/0005797 A1 | 1/2017 | Lanc |
| 2017/0005804 A1 | 1/2017 | Zinder |
| 2017/0033933 A1 | 2/2017 | Haber |
| 2017/0053249 A1 | 2/2017 | Tunnell |
| 2017/0061396 A1 | 3/2017 | Melika |
| 2017/0075938 A1 | 3/2017 | Black |
| 2017/0103167 A1 | 4/2017 | Shah |
| 2017/0124534 A1 | 5/2017 | Savolainen |
| 2017/0124535 A1 | 5/2017 | Juels |
| 2017/0134162 A1 | 5/2017 | Code |
| 2017/0148016 A1 | 5/2017 | Davis |
| 2017/0161439 A1 | 6/2017 | Raduchel |
| 2017/0177898 A1 | 6/2017 | Dillenberger |
| 2017/0178237 A1 | 6/2017 | Wong |
| 2017/0213287 A1 | 7/2017 | Bruno |
| 2017/0221052 A1 | 8/2017 | Sheng |
| 2017/0228731 A1 | 8/2017 | Sheng |
| 2017/0236123 A1 | 8/2017 | Ali |
| 2017/0243208 A1 | 8/2017 | Kurian |
| 2017/0243289 A1 | 8/2017 | Rufo |
| 2017/0244757 A1 | 8/2017 | Castinado |
| 2017/0330279 A1 | 11/2017 | Ponzone |
| 2017/0344983 A1 | 11/2017 | Muftic |
| 2017/0346693 A1 | 11/2017 | Dix |
| 2017/0352031 A1 | 12/2017 | Collin |
| 2017/0353309 A1 | 12/2017 | Gray |
| 2017/0359374 A1 | 12/2017 | Smith |
| 2017/0364642 A1 | 12/2017 | Bogdanowicz |
| 2017/0373859 A1 | 12/2017 | Shors |
| 2018/0005186 A1 | 1/2018 | Hunn |
| 2018/0048599 A1 | 2/2018 | Arghandiwal |
| 2018/0075239 A1 | 3/2018 | Boutnaru |
| 2018/0075527 A1 | 3/2018 | Nagla |
| 2018/0082043 A1 | 3/2018 | Witchey |
| 2018/0088928 A1 | 3/2018 | Smith |
| 2018/0091524 A1 | 3/2018 | Setty |
| 2018/0097779 A1 | 4/2018 | Karame |
| 2018/0101701 A1 | 4/2018 | Barinov |
| 2018/0101842 A1 | 4/2018 | Ventura |
| 2018/0108024 A1 | 4/2018 | Greco |
| 2018/0117446 A1 | 5/2018 | Tran |
| 2018/0123779 A1 | 5/2018 | Zhang |
| 2018/0139042 A1 | 5/2018 | Binning |
| 2018/0144292 A1 | 5/2018 | Mattingly |
| 2018/0157700 A1 | 6/2018 | Roberts |
| 2018/0158034 A1 | 6/2018 | Hunt |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vinay |
| 2018/0189333 A1 | 7/2018 | Childress |
| 2018/0189781 A1 | 7/2018 | McCann |
| 2018/0204213 A1 | 7/2018 | Zappier |
| 2018/0219683 A1 | 8/2018 | Deery |
| 2018/0219685 A1 | 8/2018 | Deery |
| 2018/0225640 A1 | 8/2018 | Chapman |
| 2018/0225649 A1 | 8/2018 | Babar |
| 2018/0241565 A1 | 8/2018 | Paolini-Subramanya |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276270 A1 | 9/2018 | Bisbee |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1 | 11/2018 | Hurley |
| 2018/0316502 A1 | 11/2018 | Nadeau |
| 2018/0356236 A1 | 12/2018 | Lawrenson |
| 2018/0365201 A1 | 12/2018 | Hunn |
| 2018/0365686 A1 | 12/2018 | Kondo |
| 2018/0365764 A1 | 12/2018 | Nelson |
| 2018/0367298 A1 | 12/2018 | Wright |
| 2019/0012637 A1 | 1/2019 | Gillen |
| 2019/0013948 A1 | 1/2019 | Mercuri |
| 2019/0018947 A1 | 1/2019 | Li |
| 2019/0028273 A1 | 1/2019 | Harras |
| 2019/0034459 A1 | 1/2019 | Qiu |
| 2019/0036887 A1 | 1/2019 | Miller |
| 2019/0036957 A1 | 1/2019 | Smith |
| 2019/0043048 A1 | 2/2019 | Wright |
| 2019/0044727 A1 | 2/2019 | Scott |
| 2019/0050855 A1 | 2/2019 | Martino |
| 2019/0057382 A1 | 2/2019 | Wright |
| 2019/0065709 A1 | 2/2019 | Salomon |
| 2019/0073666 A1 | 3/2019 | Ortiz |
| 2019/0080284 A1 | 3/2019 | Kim |
| 2019/0081793 A1 | 3/2019 | Martino |
| 2019/0081796 A1 | 3/2019 | Chow |
| 2019/0087446 A1* | 3/2019 | Sharma ............... G06Q 20/382 |
| 2019/0123889 A1 | 4/2019 | Schmidt-Karaca |
| 2019/0132350 A1 | 5/2019 | Smith |
| 2019/0188699 A1 | 6/2019 | Thibodeau |
| 2019/0197532 A1 | 6/2019 | Jayachandran |
| 2019/0205563 A1 | 7/2019 | Gonzales, Jr. |
| 2019/0236286 A1 | 8/2019 | Scriber |
| 2019/0251557 A1 | 8/2019 | Jin |

(56) References Cited

U.S. PATENT DOCUMENTS

| | | |
|---|---|---|
| 2019/0253240 A1 | 8/2019 | Treat |
| 2019/0253258 A1 | 8/2019 | Thekadath |
| 2019/0268141 A1 | 8/2019 | Pandurangan |
| 2019/0268163 A1 | 8/2019 | Nadeau |
| 2019/0281259 A1* | 9/2019 | Palazzolo ............... H04N 5/77 |
| 2019/0287107 A1 | 9/2019 | Gaur |
| 2019/0287199 A1 | 9/2019 | Messerges |
| 2019/0287200 A1 | 9/2019 | Schuler |
| 2019/0288832 A1 | 9/2019 | Dang |
| 2019/0296915 A1 | 9/2019 | Lancashire |
| 2019/0303623 A1 | 10/2019 | Reddy |
| 2019/0303887 A1 | 10/2019 | Wright |
| 2019/0306150 A1 | 10/2019 | Letz |
| 2019/0311357 A1 | 10/2019 | Madisetti |
| 2019/0324867 A1* | 10/2019 | Tang ................... G06F 9/465 |
| 2019/0332691 A1 | 10/2019 | Beadles |
| 2019/0333054 A1 | 10/2019 | Cona |
| 2019/0334715 A1* | 10/2019 | Gray .................... G06F 21/64 |
| 2019/0334912 A1 | 10/2019 | Sloane |
| 2019/0340586 A1 | 11/2019 | Sheng |
| 2019/0340607 A1 | 11/2019 | Lynn |
| 2019/0342422 A1 | 11/2019 | Li |
| 2019/0347444 A1 | 11/2019 | Lowagie |
| 2019/0347628 A1 | 11/2019 | Al-Naji |
| 2019/0349190 A1 | 11/2019 | Smith |
| 2019/0349426 A1 | 11/2019 | Smith |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0361917 A1 | 11/2019 | Tran |
| 2019/0372770 A1 | 12/2019 | Xu |
| 2019/0378128 A1 | 12/2019 | Moore |
| 2019/0385165 A1 | 12/2019 | Castinado |
| 2019/0386940 A1 | 12/2019 | Hong |
| 2019/0391540 A1 | 12/2019 | Westervelt |
| 2019/0391858 A1 | 12/2019 | Studnicka |
| 2019/0394044 A1 | 12/2019 | Snow |
| 2019/0394048 A1 | 12/2019 | Deery |
| 2020/0004263 A1 | 1/2020 | Dalla Libera |
| 2020/0004946 A1 | 1/2020 | Gilpin |
| 2020/0005290 A1 | 1/2020 | Madisetti |
| 2020/0019937 A1 | 1/2020 | Edwards |
| 2020/0034571 A1 | 1/2020 | Fett |
| 2020/0034813 A1 | 1/2020 | Calinog |
| 2020/0042635 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0067907 A1 | 2/2020 | Avetisov |
| 2020/0075056 A1 | 3/2020 | Yang |
| 2020/0089690 A1* | 3/2020 | Qiu .................... H04L 9/3271 |
| 2020/0099524 A1 | 3/2020 | Schiatti |
| 2020/0099534 A1 | 3/2020 | Lowagie |
| 2020/0104712 A1* | 4/2020 | Katz .................... G07F 17/329 |
| 2020/0118068 A1 | 4/2020 | Turetsky |
| 2020/0127812 A1 | 4/2020 | Schuler |
| 2020/0134760 A1 | 4/2020 | Messerges |
| 2020/0145219 A1 | 5/2020 | Sebastian |
| 2020/0167870 A1 | 5/2020 | Isaacson |
| 2020/0175506 A1 | 6/2020 | Snow |
| 2020/0195441 A1 | 6/2020 | Suen |
| 2020/0211011 A1 | 7/2020 | Anderson |
| 2020/0234386 A1 | 7/2020 | Blackman |
| 2020/0258061 A1 | 8/2020 | Beadles |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |
| 2020/0302433 A1 | 9/2020 | Green |
| 2020/0314648 A1 | 10/2020 | Cao |
| 2020/0320097 A1 | 10/2020 | Snow |
| 2020/0320514 A1 | 10/2020 | Snow |
| 2020/0320521 A1 | 10/2020 | Snow |
| 2020/0320522 A1 | 10/2020 | Snow |
| 2020/0320620 A1 | 10/2020 | Snow |
| 2020/0374129 A1 | 11/2020 | Dilles |
| 2020/0382480 A1 | 12/2020 | Isaacson |
| 2020/0389294 A1 | 12/2020 | Soundararajan |
| 2021/0035092 A1 | 2/2021 | Pierce |
| 2021/0042758 A1 | 2/2021 | Durvasula |
| 2021/0044976 A1 | 2/2021 | Avetisov |
| 2021/0073212 A1 | 3/2021 | Conley |
| 2021/0073750 A1 | 3/2021 | Ledford |
| 2021/0090076 A1 | 3/2021 | Wright |
| 2021/0097602 A1 | 4/2021 | Eichel |
| 2021/0119785 A1 | 4/2021 | Ben-Reuven |
| 2021/0144149 A1 | 5/2021 | Simons |
| 2021/0174353 A1 | 6/2021 | Snow |
| 2021/0200653 A1 | 7/2021 | Jetzfellner |
| 2021/0201321 A1 | 7/2021 | Studnitzer |
| 2021/0201328 A1 | 7/2021 | Gunther |
| 2021/0226769 A1 | 7/2021 | Snow |
| 2021/0226773 A1 | 7/2021 | Snow |
| 2021/0241282 A1 | 8/2021 | Gu |
| 2021/0248514 A1 | 8/2021 | Cella |
| 2021/0266167 A1 | 8/2021 | Lohe |
| 2021/0266174 A1 | 8/2021 | Snow |
| 2021/0272103 A1 | 9/2021 | Snow |
| 2021/0273810 A1 | 9/2021 | Lynde |
| 2021/0273816 A1 | 9/2021 | Deery |
| 2021/0326815 A1 | 10/2021 | Brody |
| 2021/0328804 A1 | 10/2021 | Snow |
| 2021/0342836 A1 | 11/2021 | Cella |
| 2021/0366586 A1 | 11/2021 | Ryan |
| 2022/0006641 A1 | 1/2022 | Snow |
| 2022/0012731 A1 | 1/2022 | Derosa-Grund |
| 2022/0019559 A1 | 1/2022 | Snow |
| 2022/0020001 A1 | 1/2022 | Snow |
| 2022/0023742 A1 | 1/2022 | Tran |
| 2022/0027893 A1 | 1/2022 | Snow |
| 2022/0027897 A1 | 1/2022 | Snow |
| 2022/0027994 A1 | 1/2022 | Snow |
| 2022/0027995 A1 | 1/2022 | Snow |
| 2022/0027996 A1 | 1/2022 | Snow |
| 2022/0029805 A1 | 1/2022 | Snow |
| 2022/0030054 A1 | 1/2022 | Snow |
| 2022/0034004 A1 | 2/2022 | Snow |
| 2022/0040557 A1 | 2/2022 | Tran |
| 2022/0043831 A1 | 2/2022 | Douglass |
| 2022/0058622 A1 | 2/2022 | Snow |
| 2022/0058623 A1 | 2/2022 | Snow |
| 2022/0083991 A1 | 3/2022 | Kemper |
| 2022/0103341 A1 | 3/2022 | Snow |
| 2022/0103343 A1 | 3/2022 | Snow |
| 2022/0103344 A1 | 3/2022 | Snow |
| 2022/0103364 A1 | 3/2022 | Snow |
| 2022/0141231 A1 | 5/2022 | Simons |
| 2022/0156737 A1 | 5/2022 | Wright |
| 2022/0172207 A1 | 6/2022 | Cella |
| 2022/0173893 A1 | 6/2022 | Basu |
| 2022/0198554 A1 | 6/2022 | Filter |
| 2022/0215389 A1 | 7/2022 | Balaraman |
| 2022/0245626 A1 | 8/2022 | Sewell |
| 2023/0185783 A1 | 6/2023 | Haddad |

FOREIGN PATENT DOCUMENTS

| | | |
|---|---|---|
| CN | 110599147 A | 12/2019 |
| CN | 112329041 A | 2/2021 |

(56) References Cited

FOREIGN PATENT DOCUMENTS

| | | |
|---|---|---|
| DE | 10128728 | 1/2003 |
| EP | 3726438 A1 | 10/2020 |
| EP | 3862947 A1 | 8/2021 |
| JP | S5383297 | 7/1978 |
| JP | 2021152931 A | 9/2021 |
| KR | 100653512 | 12/2006 |
| KR | 1747221 | 5/2017 |
| KR | 101747221 | 6/2017 |
| WO | 0049797 | 8/2000 |
| WO | 2007069176 | 6/2007 |
| WO | 2015077378 | 5/2015 |
| WO | 2017190795 A1 | 11/2017 |
| WO | 2018013898 A1 | 1/2018 |
| WO | 2018109010 | 6/2018 |
| WO | 2018127923 A1 | 7/2018 |
| WO | 2018127923072018 | 7/2018 |
| WO | 2019180702 | 9/2019 |
| WO | 2019207504 | 10/2019 |
| WO | 2020125839 A1 | 6/2020 |

OTHER PUBLICATIONS

Al-Naji, Nader et al., "Basis: A Price-Stable Cryptocurrency with an Algorithmic Central Bank" www.basis.io Jun. 20, 2017, 27 pages.

Alsolami, Fahad, and Terrance E. Boult. "CloudStash: using secret-sharing scheme to secure data, not keys, in multi-clouds." Information Technology: New Generations (ITNG), 2014 11th International Conference on. IEEE, 2014.

Ana Reyna et al.; On blockchain and its integration with IoT. Challenges and opportunities. Future generation computer systems. vol. 88, Nov. 2018, pp. 173-190. https://www.sciencedirect.com/science/article/pii/S0167739X17329205 (Year: 2018).

Casey, "BitBeat: Factom Touts Blockchain Tool for Keeping Record Keepers Honest", Wall Street Journal, Nov. 5, 2014.

Chakravorty, Antorweep, and Chunming Rong, "Ushare: user controlled social media based on blockchain." Proceedings of the 11th International Conference on Ubiquitous Information Management and Communication. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

Crosby, Michael et al., "BlockChain Technology, Beyond Bitcoin", Sutardja Center for Entrepreneurship & Technology, Berkeley Engineering, Oct. 16, 2015, 35 pages.

Dai et al. TrialChain: A Blockchain-Based Platform to Validate Data Integrity in Large, Biomedical Research Studies arXiv: 1807.03662 Jul. 10, 2018 (Year: 2018).

Eberhardt et al., "ZoKrates—Scalable Privacy-Preserving Off-Chain Computations," https://ieeexplore.ieee.org/stamp/JSP?tp:::&armumber:::8726497. (Year:2018).

Feng and Luo, "Evaluating Memory-Hard Proof-of-Work Algorithms on Three Processors," PVLDB, 13(6): 898-911, 2020.

Fernandez-Carames et al.; A Review on the Use of Blockchain for the Internet of Things. https://ieeexplore.ieee.org/stamp/stamp.jsp?arnumber=8370027 (Year: 2018). 23 pages.

Haarmann, et al., "DMN Decision Execution on the Ethereum Blockchain," Hasso Plattner Institute, University of Potsdam, 15 pages.

Iddo Bentov, Bitcoin and Secure Computation with Money, May 2016 (Year: 2016).

Kim et al., "A Perspective on Blockchain Smart Contracts," Schulich School of Business, York University, Toronto, Canada, 6 pages.

Kroeger, T. et al., The Case for Distributed Data Archival Using Secret Splitting with Percival, 6th International Symposium on Resilient Control Systems (available at IEEE Xplore), p. 204-209 (Year: 2013).

Krol, Michal et al., "SPOC: Secure Payments for Outsourced Computations" https://arxiv.org/pdf/1807.06462.pdf. (Year: 2018).

Luther, "Do We Need A "Fedcoin" Cryptocurrency?," ValueWalk, Newstex Global Business Blogs, Dec. 30, 2015 (Year: 2015).

Luu et al., Making Smart Contracts Smarter, 2016.

Menezes, Alfred. J., et al. "Handbook of Applied Cryptography," 1997, CRC Press, p. 527-28.

Muhamed et al. EduCTX: A Blockchain-Based Higher Education Credit Platform, https://ieeexplore.ieee.org/stamp/stamp.jsp?arnumber=8247166. (Year: 2017). 16 pages.

Sokolowski, R. (2011). Signed, sealed, delivered: EMortgages are protected from unauthorized alteration by something called a tamper seal. Mortgage Banking, 71(6), 108(4). Retrieved from https://dialog.proquest.com/professional/docview/1068158815? accountid=131444 (Year: 2011).

United States: New Generation cryptocurrency, USDX Protocol, Offers Crypto Advantages and Fiat Pegging, Apr. 2, 2018 (Year: 2018).

Unknown, "Federated Learning: Collaborative Machine Learning without Centralized Training Data" Apr. 6, 2017, 11 pages.

Unknown, "Midex", https://promo.midex.com/Midex_EN.pdf, 25 pages.

Unknown, Xtrade White Paper, https://xtrade1-9649.kxcdn.com/wp-content/uploads/2017/09/xtrade-whitepaper.pdf Feb. 7, 2018, 37 pages.

Watanabe, Hiroki, et al. "Blockchain contract: Securing a blockchain applied to smart contracts." 2016 IEEE International Conference on Consumer Electronics (ICCE). IEEE, 2016.

White, Ron, "How Computers Work," Oct. 2003, QUE, Seventh Edition (Year: 2003), 23 pages.

Why offchain storage is needed for blockchain_V4_1 FINAL (Year: 2018), by IBM, 13 pages.

Written Opinion in PCT/US2021/040207, Inventor Snow, dated Oct. 7, 2021, 14 pages.

ZoKrates—Scalable Privacy-Preserving Off-Chain Computations, by Jacob Eberhardt, Stefan Tai , 8 pages, Nov. 3, 2011 (Year: 2011).

Merkle Mountain Ranges (MMRs)-Grin Documentation, https://quentinlesceller.github.io/grin-docs/technical/building-blocks/merkle-mountain-ranges/, 5 pages, printed Jun. 1, 2022.

Merkle Mountain Ranges, https://github.com/opentimestamps/opentimestamps-server/blob/master/doc/merkle-mountain-range.md, 3 pages, printed Jun. 1, 2022.

Michelson, Kyle, et al., "Accumulate: An identity-based blockchain protocol with cross-chain support, human-readable addresses, and key management capabilities", Accumulate Whitepaper, v1.0, Jun. 12, 2022, 28 pages.

MOF-BC: A Memory Optimized and Flexible BlockChain for Large Scale Networks. lle:///C:/Users/eoussir/Documents/e-Red%20Folder/16905961/NPL_MOF_BC_A%20Memory%20Optimized%20and%20Flexible%20Blockchain.pdf (Year:2018) 43 pages.

On blockchain and its integration with IoT. Challenges and opportunities. file:///C:/Users/eoussir/Downloads/1-s2.0S0167739X17329205-main%20(1). pdf (Year: 2018) 18 pages.

P. Sood, P. Palsania, S. Ahuja, S. Kumar, K. Khatter and A. Mishra, "Decentralised & Collaborative DocuPad Using Blockchain," 2022 IEEE Delhi Section Conference (DELCON), New Delhi, India, 2022, pp. 1-8, doi: 10.1109/DELCON54057.2022.9752853. ( Year: 2022).

\* cited by examiner

IMPORT AND EXPORT IN BLOCKCHAIN ENVIRONMENTS

CROSS-REFERENCE TO RELATED APPLICATIONS

This patent application is a continuation of U.S. application Ser. No. 16/905,947 filed Jun. 19, 2020, which is a continuation of U.S. application Ser. No. 15/983,612 filed May 18, 2018, since issued as U.S. Pat. No. 10,783,164, both of which applications are incorporated herein by reference in their entirety. This patent application also relates to U.S. application Ser. No. 15/983,572 filed May 18, 2018, entitled "Private Cryptocoinage in Blockchain Environments", and incorporated herein by reference in its entirety. This application also relates to U.S. application Ser. No. 15/983,595 filed May 18, 2018, entitled "Load Balancing in Blockchain Environments", and incorporated herein by reference in its entirety. This application also relates to U.S. application Ser. No. 15/983,632 filed May 18, 2018, entitled "Personal Blockchain Services", and incorporated herein by reference in its entirety. This application also relates to U.S. application Ser. No. 15/983,655 filed May 18, 2018, entitled "Private Blockchain Services", and incorporated herein by reference in its entirety.

BACKGROUND

Blockchain usage is growing. As cryptographic blockchain gains acceptance, improved techniques are needed to provide greater record keeping.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
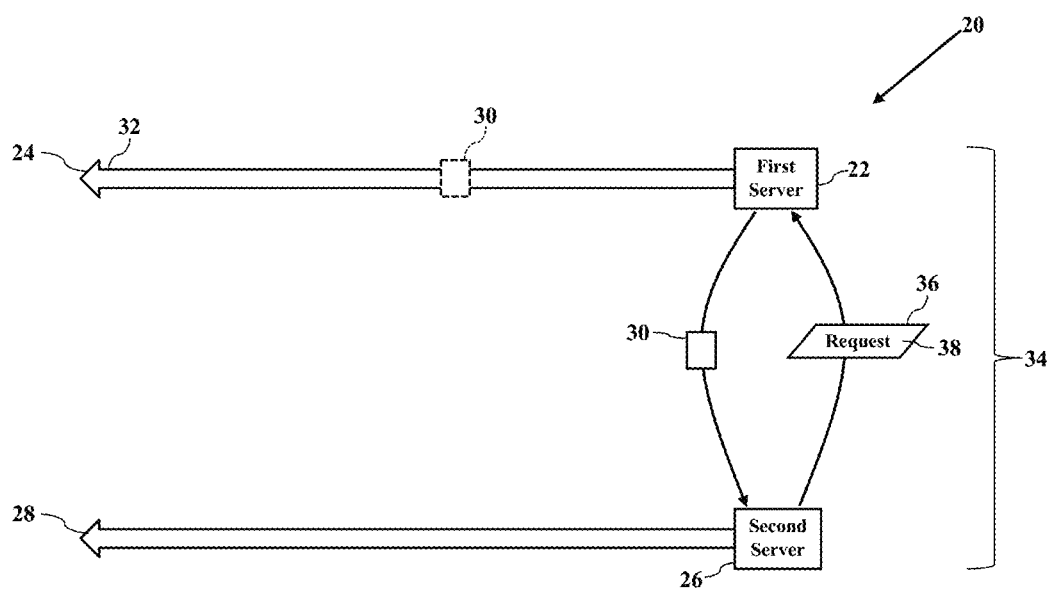
FIGS. 1-8 are simplified illustrations of importation and exportation in a blockchain environment, according to exemplary embodiments.

FIGS. 1-8 are simplified illustrations of importation and exportation in a blockchain environment 20, according to exemplary embodiments. FIG. 1 illustrates a first server 22 generating a first blockchain 24 and a second server 26 generating a second blockchain 28. As the reader may understand, the first blockchain 24 may integrate or chain one or more cryptographically hashed blocks 30 of data, timestamps, and other data. The block 30 of data is enlarged for clarity. The first blockchain 24 may thus be an open, distributed ledger 32 that records transactions for validation and distribution.

Here, though, exemplary embodiments permit an importation 34. That is, exemplary embodiments allow blockchains to import data from other blockchains. FIG. 1 illustrates a simple example in which the single block 30 of data is imported by the second server 26 and/or the second blockchain 28. The second server 26, for example, calls or retrieves the single block 30 of data as an input to the second blockchain 28. The second server 26 may submit a request 36 for importation to the first blockchain 24. The request 32 for importation may include an import specification 38 that specifies inputs, parameters, or other information required of input data (such as an identifier of the single block 30 of data). The first server 22 retrieves the single block 30 of data and sends the single block 30 of data as a response to the second server 26 and/or the second blockchain 28. The second server 26 may then act on the single block 30 of data imported from the first blockchain 24. Moreover, the second server 26 may even apply another layer of cryptographic hashing, thus linking or chaining the single block 30 of data to an entry or block within the second blockchain 28. The second blockchain 28, in other words, confirms or verifies the importation of the single block 30 of data from the first blockchain 24.

Figure 2:
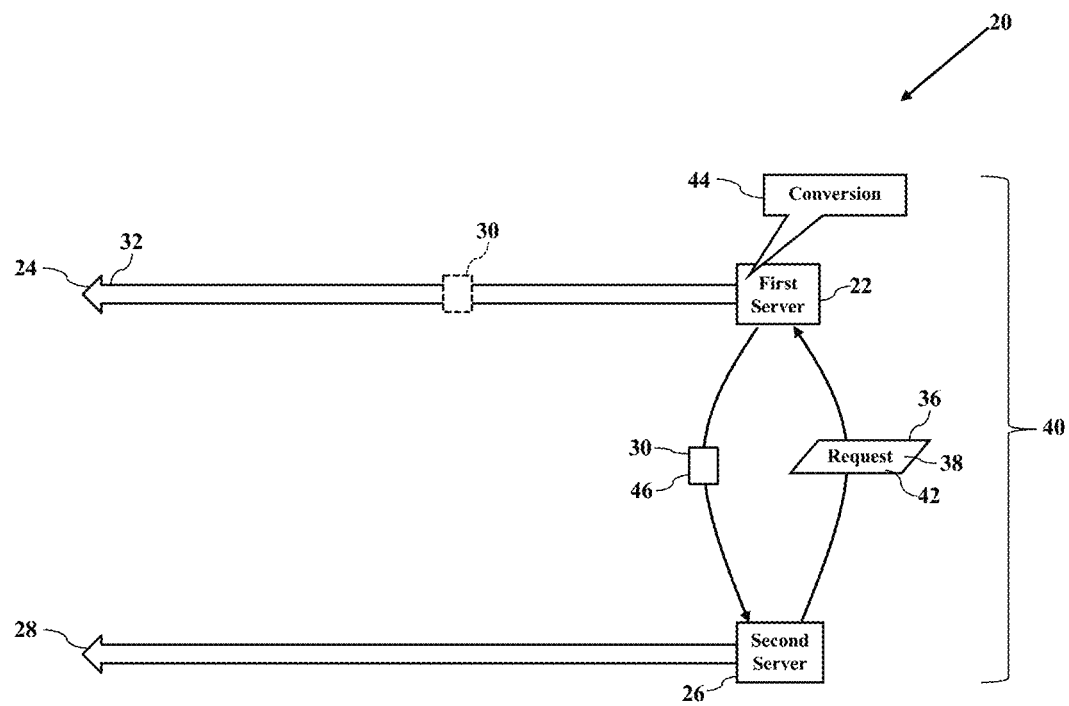

FIG. 2 illustrates an exportation 40. Here exemplary embodiments may convert the single block 30 of data into a different format. When the second server 26 sends the request 36 for importation, the importation specification 38 may specify a format 42 for input data. When the first server 22 retrieves the single block 30 of data, the first server 22 may perform a file or format conversion 44 to satisfy the format 40 specified by the importation specification 38. The first server 22 has thus reformatted or converted the single block 30 of data to comply with the format 42 specified by the importation specification 38. Once the conversion 42 is complete, the first server 22 sends a reformatted version 46 of the single block 30 of data to the second server 26, perhaps as a response to the request 36 for importation. The first server 22 may additionally or alternatively push the reformatted version 46 of the single block 30 of data to the second server 26. Regardless, the second server 26 may then process the reformatted version 46 for any purpose or function. As a simple example, the second server 26 may integrate the reformatted version 46 (imported from the first blockchain 24) into the second blockchain 28. Exemplary embodiments may thus link or chain the reformatted version 46 to the second blockchain 28.

Figure 3:
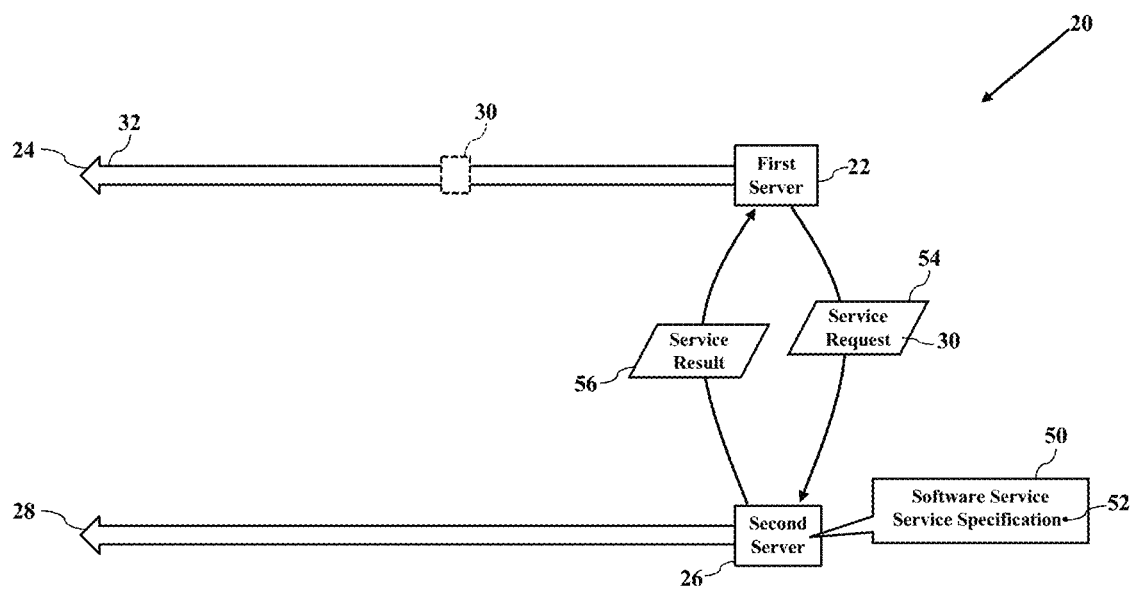

FIG. 3 illustrates functional subcontracting. Here exemplary embodiments may export or outsource any data or information for performance or application of a software function. Suppose, for example, that the second blockchain 28 is associated with a software service 50 performed by the second server 26. The second server 26 and/or the second blockchain 28, in other words, offers or advertises the software service 50 to other blockchains (such as the first blockchain 24 generated by the first server 22). The software service 50 may require that input data satisfy a source specification 52 that specifies inputs, parameters, or other information that is required of input data to perform the software service 50. When the first blockchain 24 requires or desires the software service 50, the first server 22 sends a service request 54 for the service, and the service request 54 may include or specify input data. Again, as a simple example, suppose the first blockchain 24 desires to submit the single block 30 of data to the software service 50. The first server 22 may thus retrieve and send the single block 30 of data to the second server 26. When the second server 26 receives the service request 54, the second server 26 applies the software service 50 to the block 30 of data sent from the first blockchain 24. When the software service 50 is complete, the second server 26 sends a service result 56 back to the first server 22. The service result 56 contains data or information describing an outcome, calculation, or value resulting from the software service 50 applied to the single block 30 of data. The first server 22 may then integrate the service result 56 (perhaps imported from the second blockchain 28) into the first blockchain 24. Again, then, either or both of the first blockchain 24 and the second blockchain 28 document the service result 56 generated by the software service 50.

Figure 4:
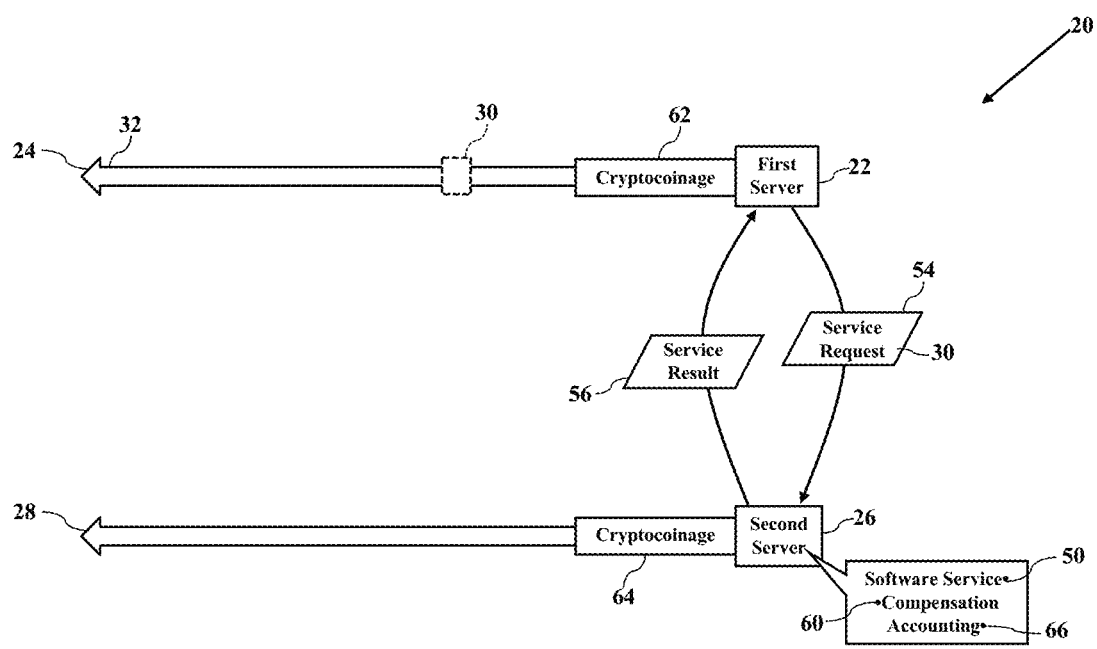

FIG. 4 illustrates a compensation scheme. When the second blockchain 28 provides the software service 50, the second blockchain 28 may be compensated for performing the software service 50. That is, the second server 26 and/or the second blockchain 28 executes the software service 50 in exchange for some kind of compensation 60. While the compensation 60 may be a conventional currency, FIG. 4 illustrates cryptocurrencies (or "cryptocoinage") 62 and 64. That is, the first server 22 and the second server 36 may exchange electronic tokens, coins, or other forms of the cryptocurrencies 62 and 64. The compensation 60 may then be recorded as a transaction or block of data within the first blockchain 24 and/or the second blockchain 28. The first server 22 and/or the second server 26 may thus generate an accounting 66 in response to the service result 56 generated by the second blockchain 28. Moreover, either or both of the first blockchain 24 and the second blockchain 28 may also document the accounting 66 in response to the service result 56.

Figure 5:
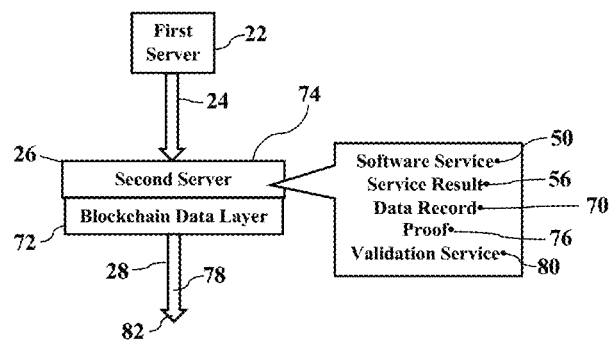

FIG. 5 illustrates public documentation. When the second server 26 provides or performs the software service 50, here exemplary embodiments may publically document the software service 50. As the second server 26 performs the software service 50, the second server 26 may generate one or more data records 70 within a blockchain data layer 72. The second server 26 may thus be called or termed a data layer server 74 that generates the blockchain data layer 72, as later paragraphs will explain. Moreover, the second server 26 may also add another layer of cryptographic hashing to generate one or more cryptographic proofs 76. The cryptographic proofs 76 may then be incorporated into the second blockchain 28. While either or both of the first blockchain 24 and the second blockchain 28 may be private and/or access restricted, here the data layer server 74 may publically publish or distribute the second blockchain 28 (such as via the Internet). The second blockchain 28 may thus be a public blockchain 78 that serves or acts as a validation service 80 for the software service 50 (perhaps described by the data records 70 within the blockchain data layer 72). The public blockchain 78 thus publishes the cryptographic proofs 76 to confirm that the software service 50 was performed. The cryptographic proof 76, in other words, acts as a data anchor 82 in the public blockchain 78 to document the date and time that the software service 50 was executed to generate the service result 56. The public blockchain 78 thus acts as a public ledger that establishes chains of blocks of immutable evidence. Each cryptographic proof 76 thus provides evidentiary documentation of the software service 50.

Figure 6:
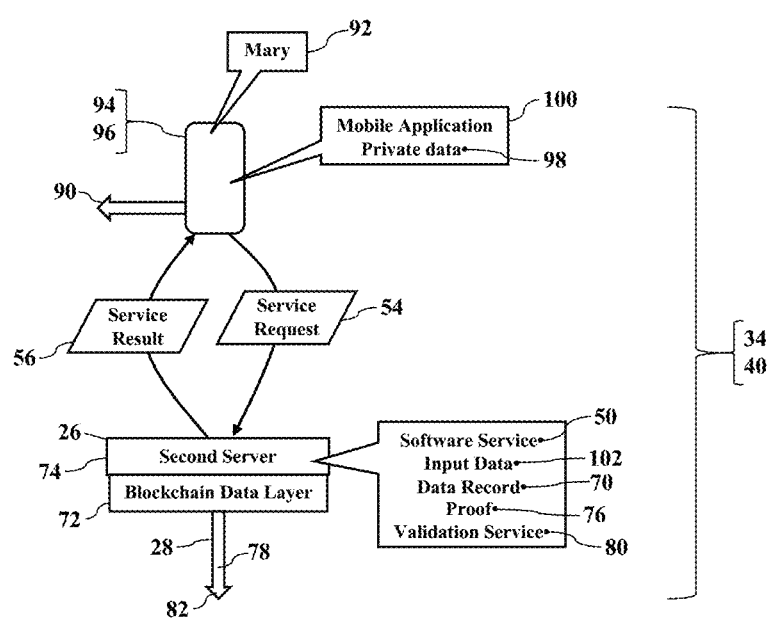

FIG. 6 applies the importation 34 and the exportation 40 to private blockchains. Here exemplary embodiments may be applied to blockchains generated by, or associated with, private entities. While any private entity may create a private blockchain 90, FIG. 6 illustrates a private person or user. For simplicity, suppose a user 92 ("Mary") uses her mobile device 94 (such as her smartphone 96) to generate a personal, private blockchain 90. As the reader likely understands, Mary may use her smartphone 96 for social postings (such as FACEBOOK® and INSTAGRAM®), for text messaging, for calls, for Internet searches, for banking transactions, and for many other tasks and reasons. Mary's smartphone 96 thus generates much private data 98 reflecting its usage (date/time, location, software application, and key strokes). Mary's smartphone 96 may thus execute a mobile application 100 that encrypts the private data 98 and generates her personal, private blockchain 90. Suppose, then, that her personal blockchain 90 requires the software service 50 provided by the second blockchain 28. Mary's smartphone 96 may thus generate and send the service request 54 to the second server 26 for application or performance of the software service 50. Mary's smartphone 96 may also identify and/or send source or input data 102 associated with the software service 50. The second server 26 applies the source or input data 102 to the software service 50 provided by the second blockchain 28 and sends the service result 56 back to Mary's smartphone 96. Mary's smartphone 96 may then integrate the service result 56 (perhaps imported from the second blockchain 28) into her personal blockchain 90. Moreover, the second server 26 may generate the data records 70 (associated with the blockchain data layer 72) describing the software service 50, add another layer of cryptographic hashing, generate the cryptographic proof 76, and incorporate the cryptographic proof 76 into the public blockchain 78. Again, then, the public blockchain 78 publishes the cryptographic proof 76 as confirmation that the software service 50 was performed. The cryptographic proof 76 again acts as the anchor 82 to document immutable evidence of the software service 50. Mary may also compensate the data layer server 74 and/or the public blockchain 78 for documenting the software service 50.

Figure 7:
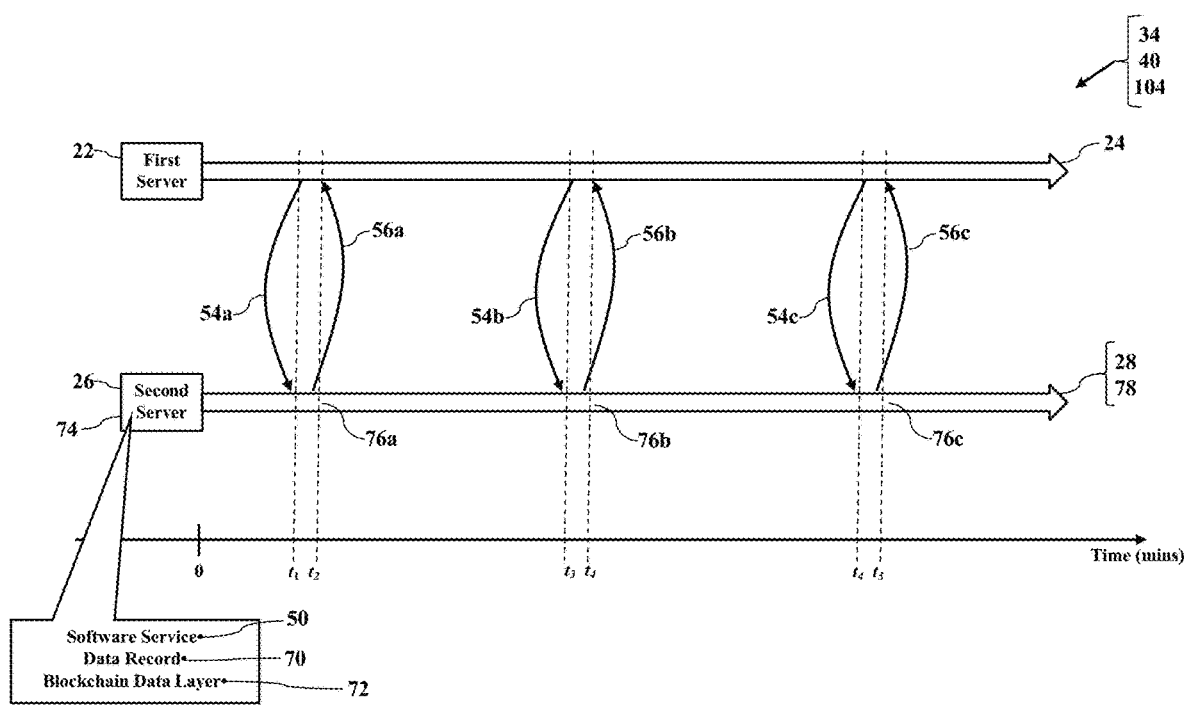

FIG. 7 illustrates nesting over time. As the first server 22 generates the first blockchain 24, multiple times the software service 50 may desired. FIG. 7 thus illustrates a timeline 104 of interactions between the first blockchain 24 and the second blockchain 28. As the first blockchain 24 propagates in time, there may be many instances in which the software service 50 is requested. FIG. 7 thus illustrates a simple example in which at approximately time $t_1$ (perhaps from an initial time 0) the first blockchain 24 sends the service request 54a. The second blockchain 28 executes the software service 50 and at approximately time $t_2$ the service result 56a is sent to the first blockchain 24. The second server 22, acting as the data layer server 74, may then generate the data records 70 of the blockchain data layer 72 that document the service result 56a. Moreover, the second server 22 may publically publish the cryptographic proof 76a within the public blockchain 78, thus further documenting immutable evidence of the service result 56a.

The software service 50 may be repeatedly called. Each time the first blockchain 24 requires the software service 50, the first blockchain 24 may invoke the service mechanism. For example, suppose at approximately time $t_3$ the first blockchain 24 again sends the service request 54b for a second application or performance of the software service 50. At approximately time $t_4$ the service result 56b is generated and sent back to the first blockchain 24. Exemplary embodiments may then generate the data records 70 of the blockchain data layer 72 that document the service result 56b and/or publically publish the cryptographic proof 76b within the public blockchain 78, again documenting immutable evidence of the service result 56b. Later, at approximately time $t_5$, the first blockchain 24 may again send the service request 54c for a third application or performance of the software service 50. At approximately time $t_6$ the service result 56c is generated and sent back to the first blockchain 24, data records 70 are generated, and the cryptographic proof 76c may be publically published within the public blockchain 78 to document the service result 56c. Moreover, the first server 22 may also generate blocks of data within the first blockchain 24 that additionally document each service request 54a-c and each service result 56a-c. The first blockchain 24 and the second blockchain 28 may thus contain blocks of data that link, relate, or intertwine blocks of data documenting each invocation of the software service 50.

Figure 8:
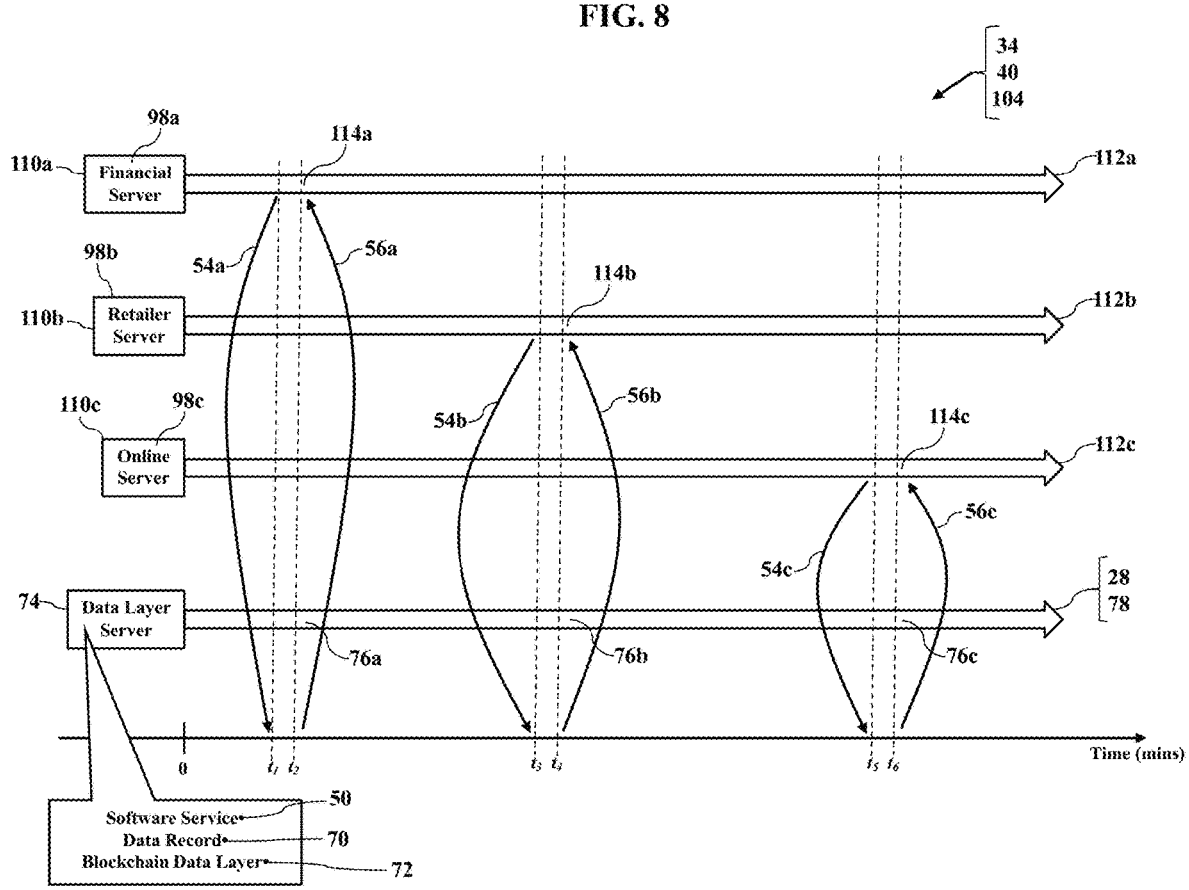

FIG. 8 further illustrates nesting of blockchains over time. As more and more businesses implement blockchain technology into their record keeping activities, vendors and suppliers will offer blockchains that specialize in different software services 50. Moreover, other blockchains will compete to offer the same or similar software services 50. FIG. 8 thus further applies the importation 34, the exportation 40, and/or the software service 50 in a supplier or subcontractor environment. That is, the software service 50 may be applied to any entity, perhaps in a subscription or other compensation scheme. Suppose, for example, that a financial server 110a is operated on behalf of a bank, lender, or other financial institution (such as PIMCO®, CITI®, or BANK OF AMERICA®). As the reader likely understands, the financial institution creates a massive amount of banking records, transaction records, mortgage instruments, and other private data 98a. The financial server 110a executes a software application (not shown for simplicity) that hashes its private data 98a and generates its private blockchain 112a. When the financial server 110a and/or the private blockchain 112a require the software service 50, at approximately time $t_1$ the service request 54a is sent and at approximately time $t_2$ the service result 56a is sent to the financial server 110a and/or the private blockchain 112a. The data layer server 74 may then generate the data records 70 of the blockchain data layer 72 that document the service result 56a. Moreover, the second server 22 may publically publish the cryptographic proof 76a within the public blockchain 78, thus further documenting immutable evidence of the service result 56a. The financial server 110a may also generate blocks of data 114a within the private blockchain 112a that also document the service request 54a and the service result 56a.

The software service 50 may be offered to other entities. Suppose that a retailer (such as HOME DEPOT®, KOHL'S®, or WALMART®) operates a retailer server 110b that hashes its private data 98b and generates its private blockchain 112b. When the retailer server 110b and/or the private blockchain 112b require the software service 50, at approximately time $t_3$ the service request 54b is sent and at approximately time $t_4$ the service result 56b is sent back to the retailer server 110b and/or the private blockchain 112b. The data layer server 74 may generate the data records 70 that document the service result 56b, and the cryptographic proof 76b may be published within the public blockchain 78. The retailer server 110b may also generate blocks of data 114b within the private blockchain 112b that also document the service request 54b and the service result 56b. Similarly, an online server 110c offering an online service (such as AMAZON®, NETFLIX®, or GOOGLE®) hashes its private data 98c and generates its private blockchain 112c. When the online server 110c and/or the private blockchain 112c require the software service 50, at approximately time $t_5$ the service request 54c is sent and at approximately time $t_6$ the service result 56c is sent back to the online server 110c and/or the private blockchain 112c. The data layer server 74 may generate the data records 70 that document the service request 54c and/or the service result 56c, and the cryptographic proof 76c may be published within the public blockchain 78. The online server 110c may also generate blocks of data 114c within the private blockchain 112c that also document the service request 55c and the service result 56c.

Exemplary embodiments thus describe elegant solutions. Blockchains may import data and export data in desired formats. Blockchains may offer and advertise software services 50, and blockchains may specialize in different software services and/or functions that perform or accomplish particular tasks. A marketplace may thus develop for vendors of different software services 50, perhaps accessible using a vendor-specific or service-specific software application that is downloaded or accessed via a web interface. Moreover, exemplary embodiments allow individual users and other private entities to create their own private blockchains using their private data 98 and restrict its distribution, if desired. Cryptographic publication provides a public witness via the anchor(s) 82 to the public blockchain 78. Exemplary embodiments thus provide importation and exportation schemes for hybrid two-way blockchain interactions and two-way ledgering for improved record keeping.

Figure 9:
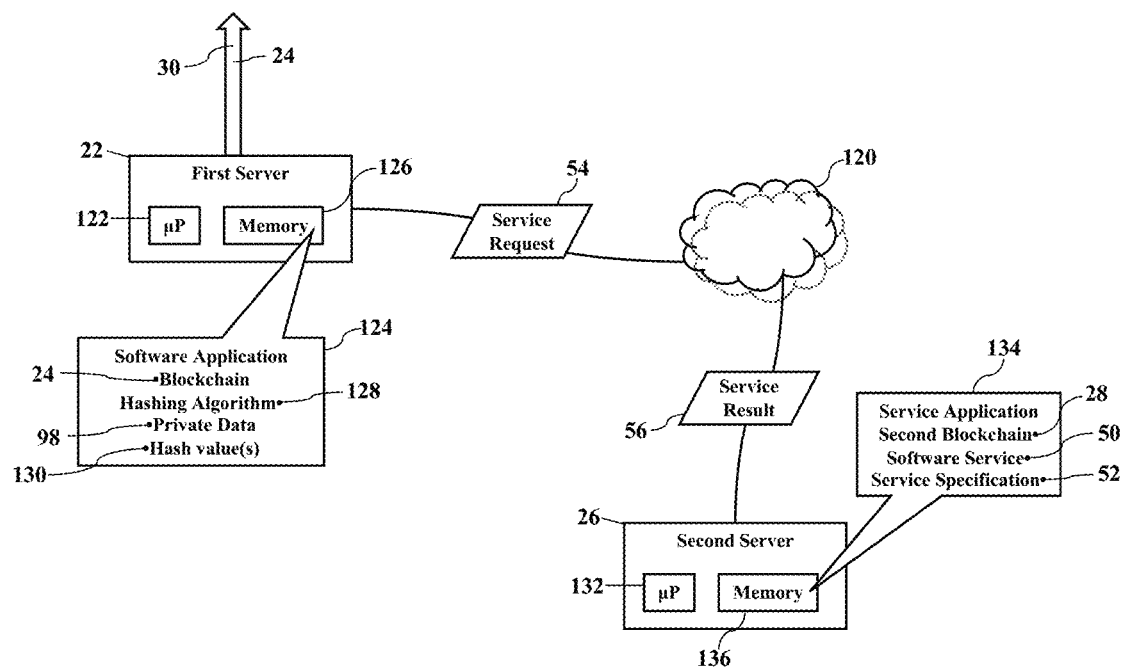
FIGS. 9-12 are more detailed illustrations of an operating environment, according to exemplary embodiments.

FIGS. 9-12 are more detailed illustrations of an operating environment, according to exemplary embodiments. FIG. 9 illustrates the first server 22 communicating with the second server 26 via a communications network 120. The first server 22 operates on behalf of any entity (such as the private user 92 illustrated in FIG. 6 or the entity servers 110a-c illustrated in FIG. 7). Whatever the entity, the first server 22 generates the first blockchain 24. The first server 22, in other words, has a processor 122 (e.g., "μP"), application specific integrated circuit (ASIC), or other component that executes a software application 124 stored in a local memory device 126. The first server 22 has a network interface to the communications network 120, thus allowing two-way, bidirectional communication with the second server 26. The entity's software application 124 includes instructions, code, and/or programs that cause the first server 22 to perform operations, such as calling, invoking, and/or applying an electronic representation of a hashing algorithm 128 to the entity's private data 98. The hashing algorithm 128 thus generates one or more hash values 130, which may be incorporated into the blocks 30 of data within the first blockchain 24.

The software service 50 may be required. When the first server 22 and/or the entity's blockchain 24 needs the software service 50, the software application 124 instructs the first server 22 to generate and send the service request 54 via the communications network 120 to any network address (such as an Internet protocol address) associated with the software service 50. Suppose, for example, that the software service 50 is executed by the second server 26. The second server 26 has a processor 132 (e.g., "μP"), application specific integrated circuit (ASIC), or other component that executes a service application 134 stored in a local memory device 136. The second server 26 has a network interface to the communications network 120. The service application 134 includes instructions, code, and/or programs that cause the second server 26 to perform operations, such as receiving the service request 54, generating the service result 56, and generating the second blockchain 28. The service application 134 may then call or invoke the network interface and send the service result 56 via the communications network 120 to the network address (such as an Internet protocol address) associated with the first server 22 and/or the entity's blockchain 24.

Figure 10:
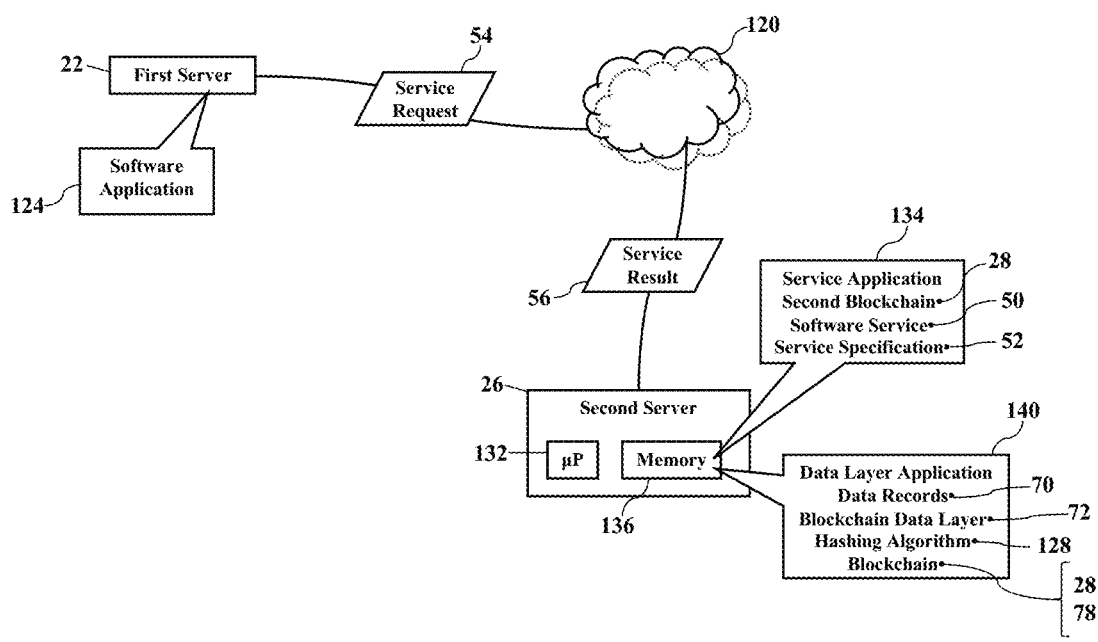

FIG. 10 illustrates the blockchain data layer 72. Here second server 26 may additionally generate the blockchain data layer 72, thus perhaps simultaneously functioning as the data layer server 74. Exemplary embodiments may thus combine or co-locate the software service 50 and the blockchain data layer 72 for improved servicing and record keeping. The service application 134 may thus call, invoke, or cooperate with a data layer application 140 (perhaps as a software module). The data layer application 140 includes instructions, code, and/or programs that cause the processor 132 to perform operations, such as creating the data records 70 associated with the blockchain data layer 72. The data records 70 may comprise data or information representing the service request 54, service result 56, and/or their corresponding hash values 130. Moreover, the data layer application 140 may itself call, invoke, and/or apply the electronic representation of the hashing algorithm 128 to the data records 70, which may be incorporated into the public or private blockchain 28 and 78.

Figure 11:
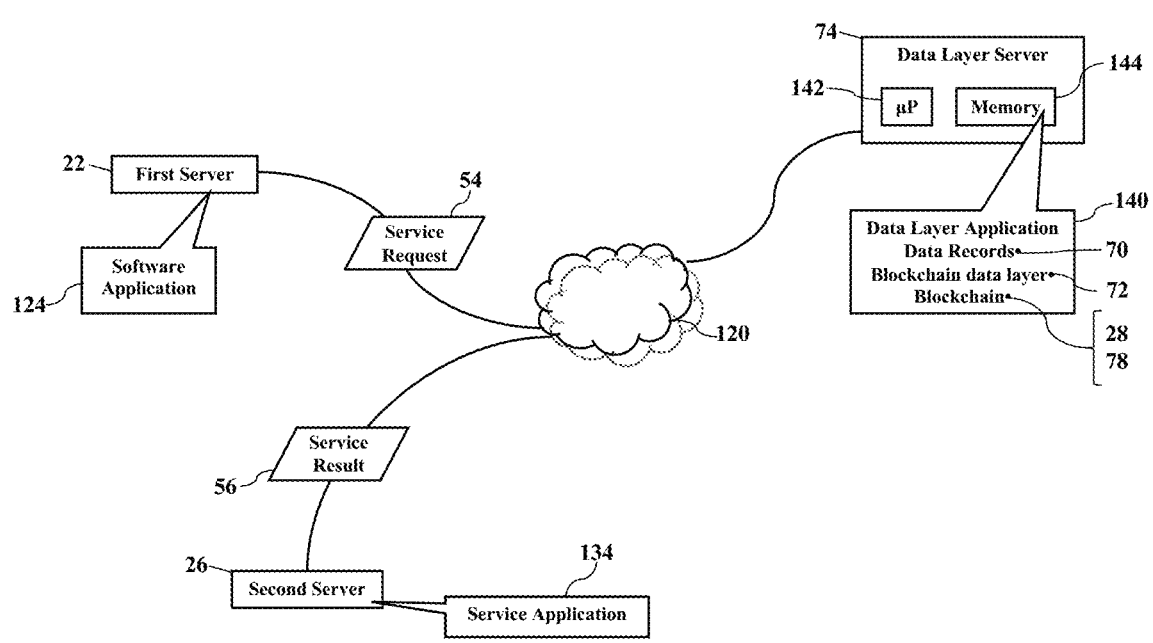

FIG. 11 further illustrates the blockchain data layer 72. Here the data layer server 74 may be a separate network element or component that generates the blockchain data layer 72. For example, when the first server 22 requests the software service 50, the software application 124 may instruct the first server 22 to copy and send the service request 54 via the communications network 120 to the network address (such as an Internet protocol address) associated with the data layer server 74. The second server 26 may additionally or alternatively copy and send the service request 54 to the data layer server 74. When the service application 134 generates the service result 56, the second server 26 may copy and send the service result 56 to the data layer server 74. The first server 22 may additionally or alternatively copy and send the service result 56 to the data layer server 74. Regardless, the data layer server 74 has a processor 142 (e.g., "μP"), application specific integrated circuit (ASIC), or other component that executes the data layer application 140 stored in a local memory device 144. The data layer server 74 has a network interface to the communications network 120. The data layer application 140 includes instructions, code, and/or programs that cause the data layer server 74 to perform operations, such as creating the data records 70 associated with the blockchain data layer 72. The data records 70 may comprise data or information representing the service request 54, service result 56, and/or their corresponding hash values 130. Moreover, the data layer application 140 may itself call, invoke, and/or apply the electronic representation of the hashing algorithm 128 to the data records 70, which may be incorporated into the public or private blockchain 28 and 78.

Exemplary embodiments may thus cooperate in a client/server fashion. The first server 22, the second server 26, and/or the data layer server 74 may cooperate to send, receive, and/or generate the service request 54, the service result 56, and/or the data records 70 associated with the blockchain data layer 72. The software application 124, the service application 134, and/or the data layer application 140 may likewise cooperate to send, receive, and/or generate the service request 54, the service result 56, and/or the data records 70 associated with the blockchain data layer 72. Indeed, the mobile application 100 (illustrated in FIG. 6) may also cooperate to send, receive, and/or generate the service request 54, the service result 56, and/or the data records 70 associated with the blockchain data layer 72.

Figure 12:
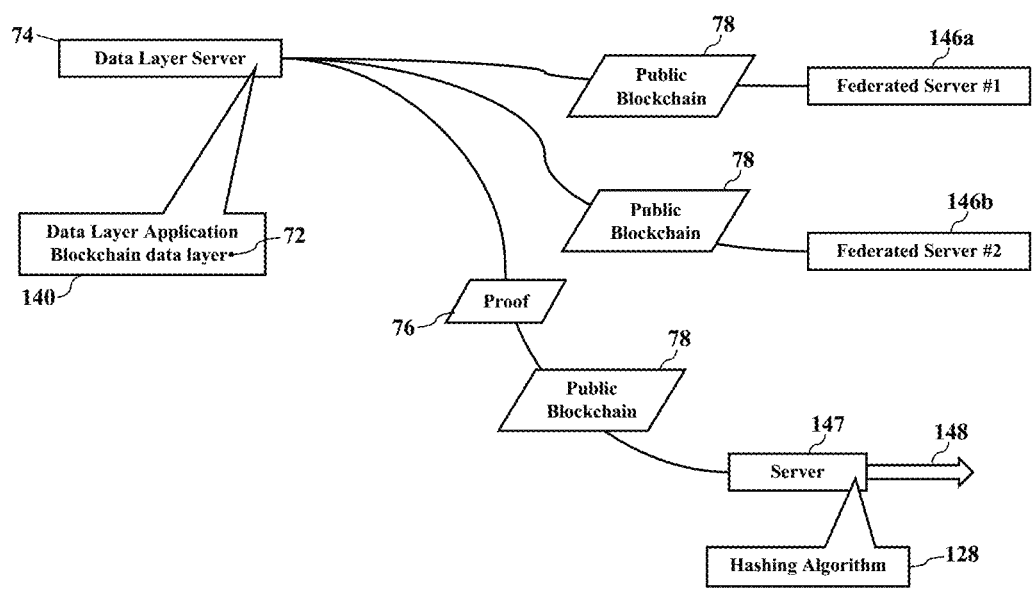
Figure 13:
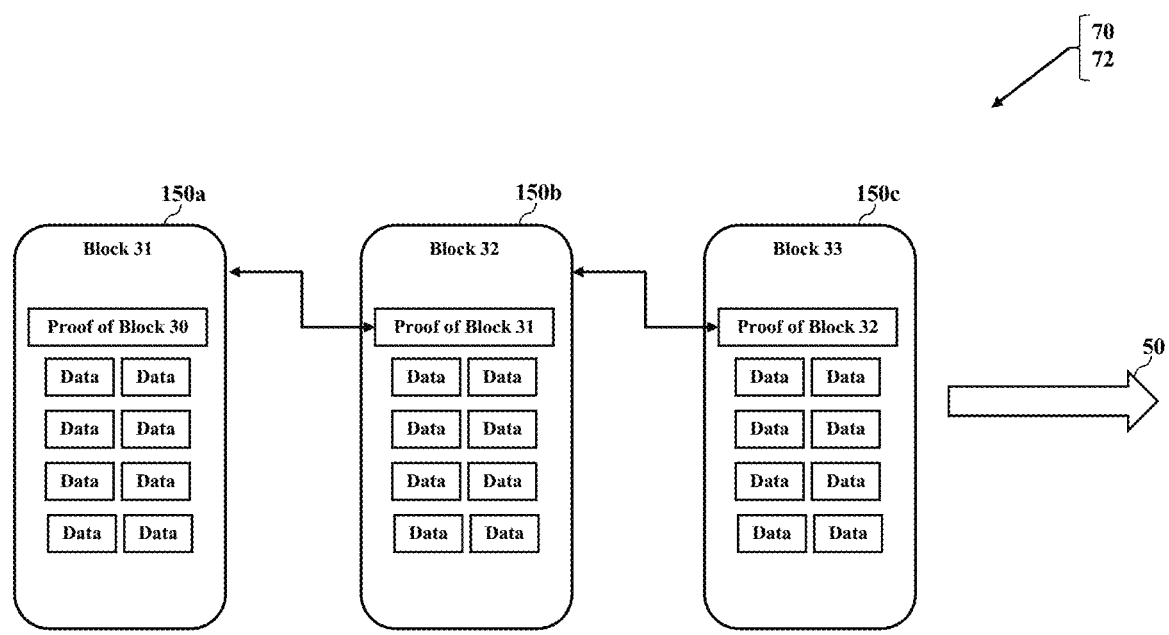
FIGS. 13-17 illustrate a blockchain data layer, according to exemplary embodiments.

FIG. 12 illustrates additional publication mechanisms. Once the blockchain data layer 72 is generated, the blockchain data layer 72 may be published in a decentralized manner to any destination. The data layer server 74, for example, may generate and distribute the public blockchain 78 (via the communications network 120 illustrated in FIGS.

9-11) to one or more federated servers 146. While there may be many federated servers 146, for simplicity FIG. 12 only illustrates two (2) federated servers 146a and 146b. The federated servers 146a and 146b provide a service and, in return, they are compensated according to a compensation or services agreement or scheme.

Exemplary embodiments include still more publication mechanisms. For example, the cryptographic proof 76 and/or the public blockchain 78 may be sent (via the communications network 120 illustrated in FIGS. 9-11) to a server 147. The server 147 may then add another, third layer of cryptographic hashing (perhaps using the hashing algorithm 128) and generate another or second public blockchain 148. While the server 147 and/or the public blockchain 148 may be operated by, or generated for, any entity, exemplary embodiments may integrate another cryptographic coin mechanism. That is, the server 147 and/or the public blockchain 148 may be associated with BITCOIN®, ETHEREUM®, RIPPLE®, or other cryptographic coin mechanism. The cryptographic proof 76 and/or the public blockchain 148 may be publically distributed and/or documented as evidentiary validation. The cryptographic proof 76 and/or the public blockchain 148 may thus be historically and publically anchored for public inspection and review.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When any device or server communicates via the communications network 120, the device or server may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

FIGS. 13-17 further illustrate the blockchain data layer 72, according to exemplary embodiments. The blockchain data layer 72 chains hashed directory blocks 150 of data into the public blockchain 78. For example, the blockchain data layer 72 accepts input data (such as the service request 54 illustrated in FIGS. 3-11) within a window of time. While the window of time may be configurable from fractions of seconds to hours, exemplary embodiments use ten (10) minute intervals. FIG. 12 illustrates a simple example of only three (3) directory blocks 150a-c of data, but in practice there may be millions or billions of different blocks. Each directory block 150 of data is linked to the preceding blocks in front and the following or trailing blocks behind. The links are created by hashing all the data within a single directory block 150 and then publishing that hash value within the next directory block.

Figure 14:
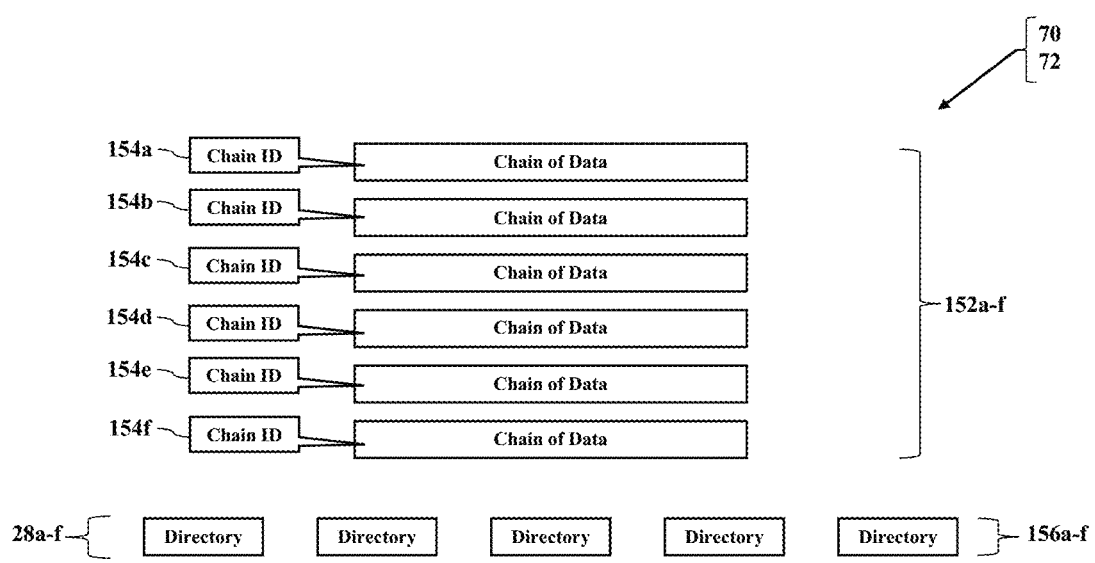

As FIG. 14 illustrates, published data may be organized within chains 152. Each chain 152 is created with an entry that associates a corresponding chain identifier 154. Each entity's blockchain, in other words, may have its corresponding chain identifier 154a-d. The blockchain data layer 72 may thus track any data associated with the entity with its corresponding chain identifier 154a-d. New and old data in time may be associated with, linked to, identified by, and/or retrieved using the chain identifier 154a-d. Each chain identifier 154a-d thus functionally resembles a directory 156a-d (e.g., files and folders) for organized data entries according to the entity.

Figure 15:
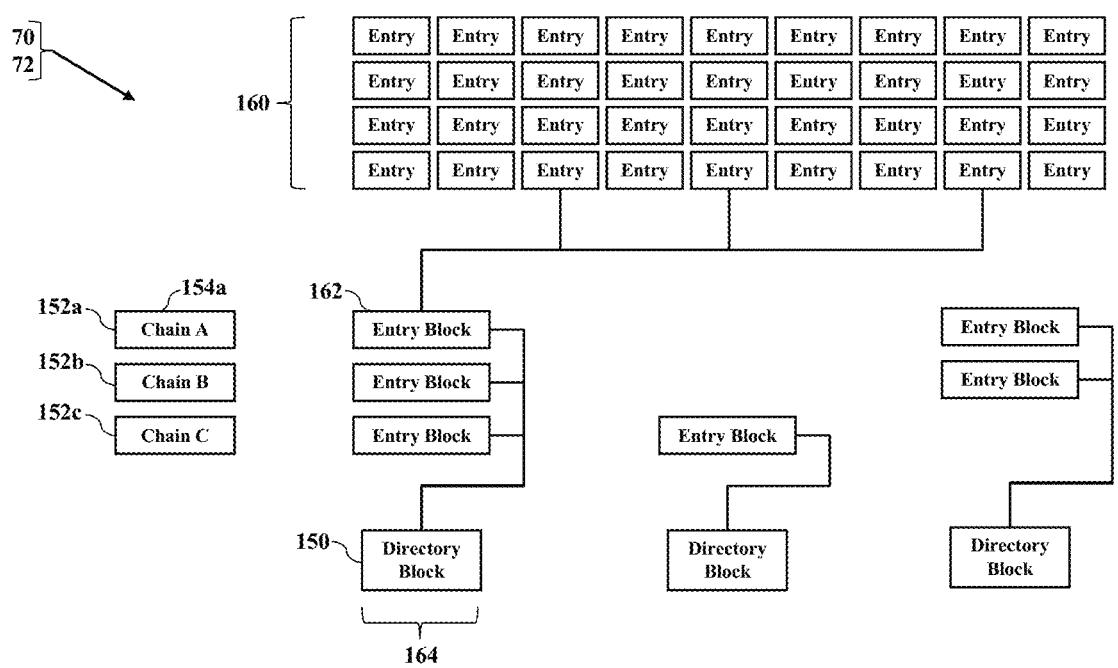

FIG. 15 illustrates the data records 70 in the blockchain data layer 72. As data is received as an input (such as the blockchain(s) 24, 28, 78, 90, and/or 112 illustrated in FIGS. 1-8), data is recorded within the blockchain data layer 72 as an entry 160. While the data may have any size, small chunks (such as 10 KB) may be pieced together to create larger file sizes. One or more of the entries 160 may be arranged into entry blocks 162 representing each chain 152 according to the corresponding chain identifier 154. New entries for each chain 152 are added to their respective entry block 162 (again perhaps according to the corresponding chain identifier 154). After the entries 160 have been made within the proper entry blocks 162, all the entry blocks 162 are then placed within in the directory block 150 generated within or occurring within a window 164 of time. While the window 164 of time may be chosen within any range from seconds to hours, exemplary embodiments may use ten (10) minute intervals. That is, all the entry blocks 162 generated every ten minutes are placed within in the directory block 150.

Figure 16:
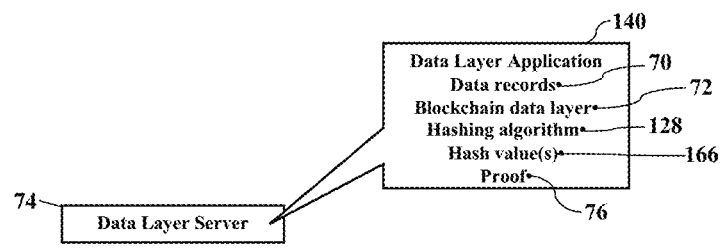

FIG. 16 illustrates cryptographic hashing. The data layer server 74 executes the data layer application 140 to generate the data records 70 in the blockchain data layer 72. The data layer application 140 may then instruct or cause the data layer server 74 to execute the hashing algorithm 128 on the data records 70 (such as the directory block 150 explained with reference to FIGS. 13-15). The hashing algorithm 128 thus generates one or more hash values 166 as a result, and the hash values 166 represent the hashed data records 70. As one example, the blockchain data layer 72 may apply a Merkle tree analysis to generate a Merkle root (representing a Merkle proof 76) representing each directory block 150. The blockchain data layer 72 may then publish the Merkle proof 76 (as this disclosure explains).

Figure 17:
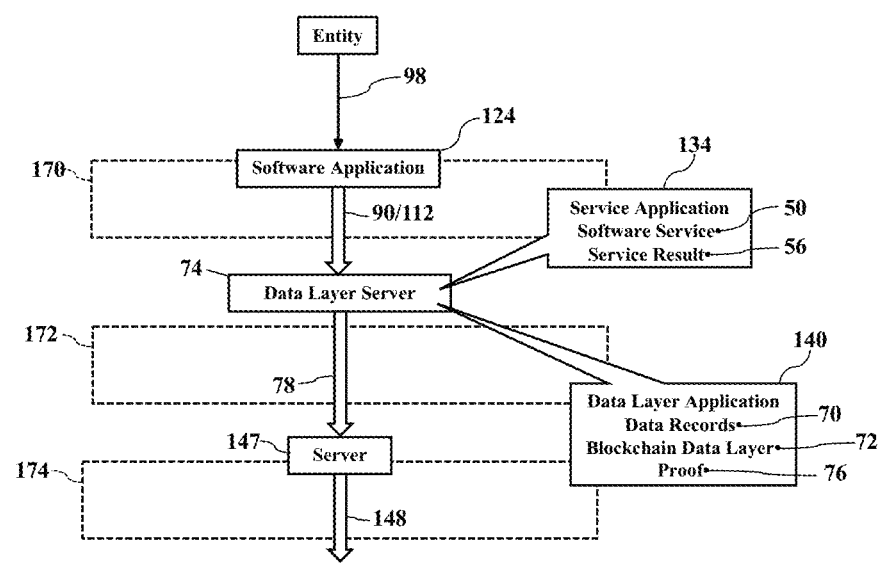

FIG. 17 illustrates hierarchical hashing. Any entity may use its software application 124 to hash its private data 98 to provide a first layer 170 of cryptographic hashing and generates the private blockchain 90/112. Any blocks of data within the private blockchain 90/112 may be sent to a destination associated with the software service 50 (such as the data layer server 74). The data layer server 74 may thus execute the service application 134 to provide the service result 56. The data layer server 74 may also execute the data layer application 140 and generate the data records 70 in the blockchain data layer 72. The data layer application 140 may optionally provide a second or intermediate layer 172 of cryptographic hashing to generate the cryptographic proof 76. The data layer application 140 may also publish any of the data records 70 as the public blockchain 78, and the cryptographic proof 76 may or may not also be published via the public blockchain 78. The public blockchain 78 and/or the cryptographic proof 76 may be optionally sent to the server 147 as an input to yet another public blockchain 148 (again, such as BITCOIN®, ETHEREUM®, or RIPPLE®) for a third layer 174 of cryptographic hashing and public publication. The first layer 170 and the second layer 172 thus ride or sit atop a conventional public blockchain 148 (again, such as BITCOIN®, ETHEREUM®, or RIPPLE®) and provide additional public and/or private cryptographic proofs 76.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

Exemplary embodiments may use any call mechanism. The service request 54, for example, may specify or define the software service 50 as a function, order, or subroutine name, perhaps along with formal parameters (perhaps as an application programming interface or API). The service request 54 may additionally or alternatively be a software or language code construct (such as a JAVA® class and/or language key).

Figure 18:
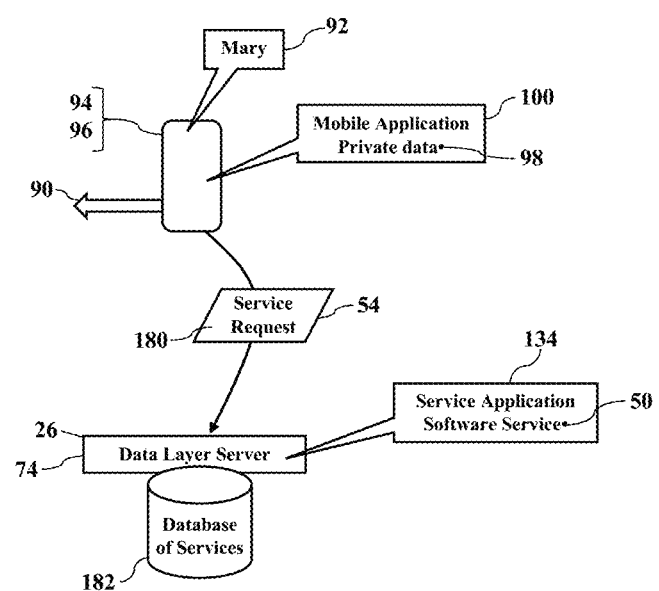
FIGS. 18-19 illustrate a service warehouse, according to exemplary embodiments.
Figure 19:
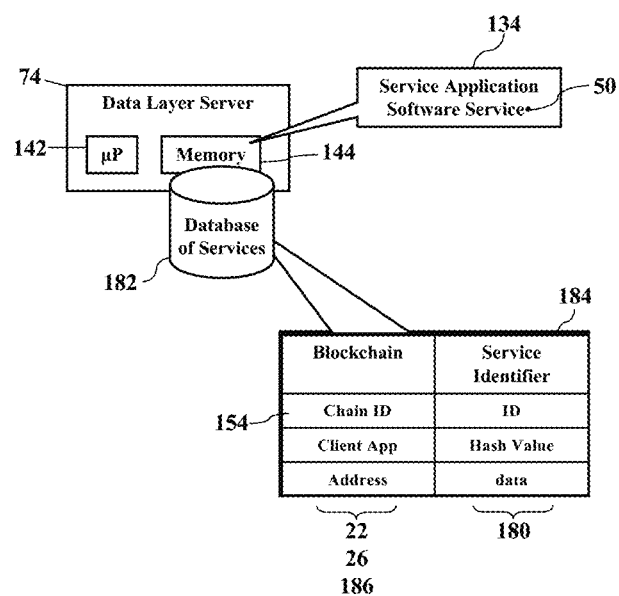

FIGS. 18-19 illustrate a service warehouse, according to exemplary embodiments. Here the data layer server 74 may operate or function as a service clearinghouse that organizes and/or manages multiple different software services 50 requested from client blockchains. As most readers are thought familiar with mobile computing, FIG. 18 again illustrates Mary's smartphone 96 generating her personal, private blockchain 90. When the mobile application 100 requires or encounters the software service 50, the mobile application 100 instructs the smartphone 96 (e.g., its processor and memory device, not shown for simplicity) to generate and send the service request 54 (via the communications network 120 illustrated in FIGS. 9-11). When the data layer server 74 receives the service request 54, the service application 134 may cause the data layer server 74 to inspect the service request 54 for a service identifier 180. The service identifier 180 may be any alphanumeric combination, hash value, or other data/information that uniquely identifies the requested software service 50.

Exemplary embodiments may consult an electronic database 182 of services. Because the data layer server 74 may manage many different software services 50, the electronic database 182 of services may be implemented to identify and/or perform the requested software service 50. FIG. 18 illustrates the data layer server 74 locally storing the database 182 of services, but the database 182 of services may be remotely stored and accessed via the communications network 120 (illustrated in FIGS. 9-11). Regardless, the data layer server 74 may query the database 182 of services for a query parameter and identify the corresponding software service 50.

FIG. 19 illustrates the electronic database 182 of services. Here the database 182 of services may define assignments between blockchains 186 and their corresponding service identifier 180. While the database 182 of services may have any logical structure, FIG. 19 illustrates the database 182 of services as a table 184 that maps, converts, or translates the service identifier 180 to its corresponding blockchain 186. As a simple example, suppose the database 182 of services configured with entries that relate the service identifier 180 to its corresponding chain ID 154. The service application 134 may instruct the data layer server 74 to query for the service identifier 180 and identify and/or retrieve the chain ID 154, a client application, a network or service address, or other indicator assigned to the corresponding service identifier 180. The database 182 of services may optionally contain entries that relate hashed values of the entries. While FIG. 19 only illustrates a few entries, in practice the database 182 of services may have many entries (perhaps hundreds or thousands) detailing a rich repository selection of software services 50. Regardless, once the blockchain 186 is identified, the service application 134 may direct or assign the service request 54 to the blockchain 186 for processing (as above explained).

Figure 20:
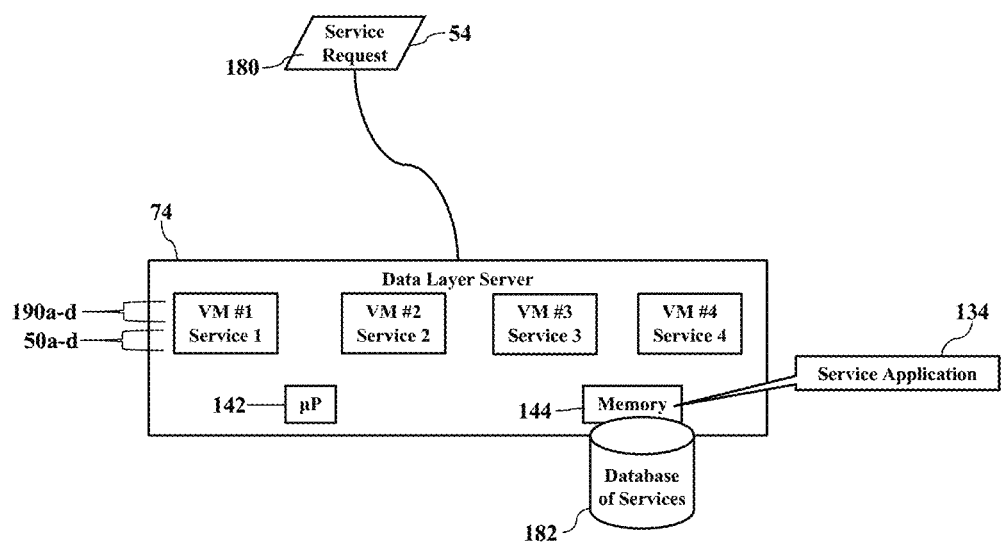
FIGS. 20-21 illustrate a virtual computing environment, according to exemplary embodiments.
Figure 21:
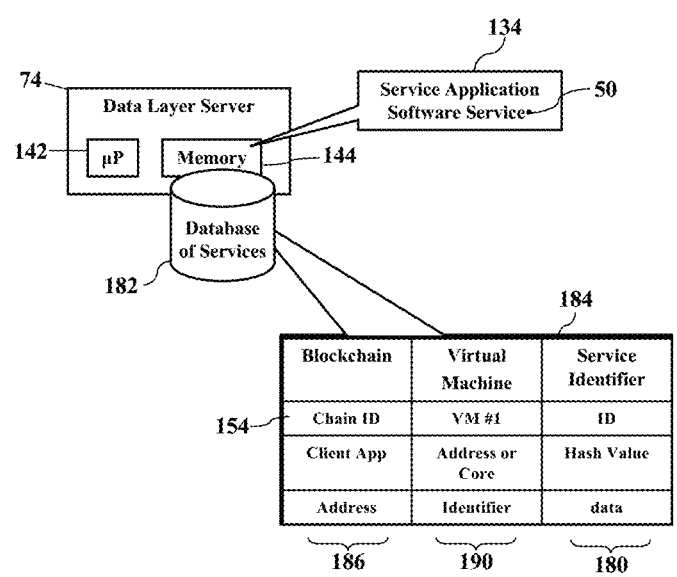

FIGS. 20-21 illustrate a virtual computing environment, according to exemplary embodiments. Here the data layer server 74 may implement different virtual machines 190, with each virtual machine 190 implementing a software service 50. The data layer server 74 may provide virtual computing and/or virtual hardware resources to client devices, thus lending or sharing its hardware, computing, and programming resources. The data layer server 74 thus operates or functions as a virtual, remote resource for providing the software services 50. While FIG. 20 only illustrates four (4) virtual machines 190a-d, the number or instantiations may be several or even many, depending on complexity and resources. Moreover, as a further simplification, assume that each virtual machine 190a-d provides a different corresponding software service 50a-d. So, when the data layer server 74 receives the service request 54, the service application 134 may cause the data layer server 74 to inspect the service request 54 for the service identifier 180 and consult the electronic database 182 of services.

FIG. 21 further illustrates the database 182 of services. Here the database 182 of services may specify the virtual machine 190 that performs or executes the software service 50. The database 182 of services may thus be preconfigured or preloaded with entries that assign or associate each virtual machine 190 to its corresponding service identifier 180. The service application 134 queries for the service identifier 180 to identify the corresponding virtual machine 190. Exemplary embodiments may thus determine whether the service identifier 180 matches or satisfies any of the entries specified by the database 182 of services. FIG. 21 illustrates entries that map the service identifier 180 to its corresponding virtual machine 190 (e.g., an address, processor core, identifier, or other indicator), the chain ID 154, and other tabular information. Once the virtual machine 190 is identified, the service application 134 may direct or assign the service request 54 to the corresponding blockchain 186 for processing (as above explained).

Figure 22:
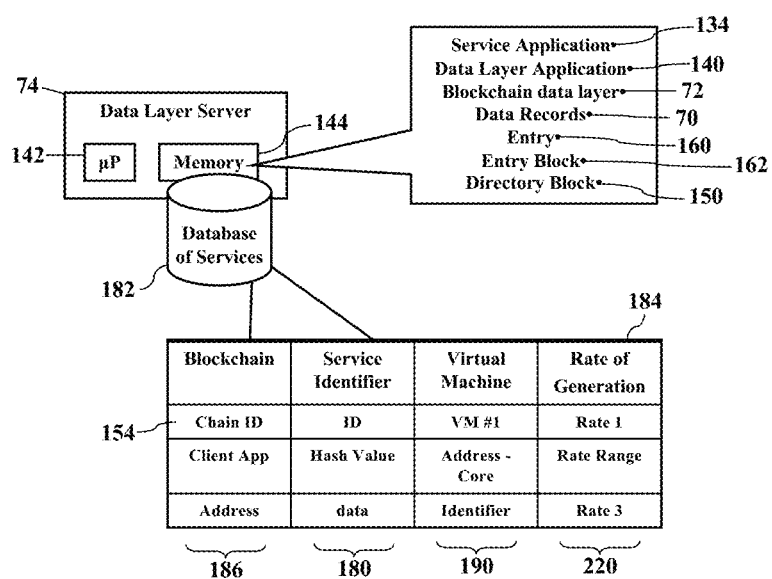
FIG. 22 illustrates allocations based on the blockchain data layer, according to exemplary embodiments.

FIG. 22 illustrates allocations based on the blockchain data layer 72, according to exemplary embodiments. As this disclosure previously explained, exemplary embodiments may generate the data records 70 representing the blockchain data layer 72 (such as the entries 160, entry blocks 162, and/or the directory blocks 150 explained with reference to FIGS. 13-15). Exemplary embodiments may thus assign the blockchain (e.g., reference numerals 24, 28, 78, 90, 112, and/or 186 above explained) and/or the virtual machine 190 that executes the software service 50, based on the number of the entries 160, the entry blocks 162, and/or the directory blocks 150 generated within the blockchain data layer 72. For example, as the data records 70 are generated, the data layer server 74 may determine a rate 200 of generation. That is, as the data records 70 are generated when or while providing the software service 50, exemplary embodiments may sum or count the entries 160, the entry blocks 162, and/or the directory blocks 150 that are generated over time (such as per second, per minute, or other interval). The service application 134 and/or the data layer application 140, for example, calls or initializes a counter having an initial value (such as zero). At an initial time, the counter commences or starts counting or summing the number of the entries 160, entry blocks 162, and/or the directory blocks 150 (generated within the blockchain data layer 72) that are commonly associated with or reference the software service 50, the service request 54, and/or the service result 56 (perhaps according to the chain ID 154, the virtual machine 190, and/or the cryptocoinage 62 and 64 illustrated in FIG. 4). The counter stops counting or incrementing at a final time and exemplary embodiments determine or read the final value or count. Exemplary embodiments may then calculate the rate 220 of generation as the sum or count over time and consult or query the electronic database 182 of services for the rate 220 of generation. The electronic database 182 of services may thus define entries that map or associate different rates 220 of generation and/or ranges to their corresponding software services 50 (such as the service identifier 180), blockchains 186, and/or virtual machines 190. If the database 182 of services has an entry that matches or satisfies the rate 220 of generation, exemplary embodiments identify the corresponding software service 50, blockchain 186, and/or virtual machine 190.

The rate 220 of generation may thus be a feedback mechanism. As the software services 50 are requested, the rate 220 of generation of the data records 70 may determine the blockchain (e.g., reference numerals 24, 28, 78, 90, 112, and/or 186 above explained) and/or the virtual machine 190 assigned adequate capacity or bandwidth. One of the blockchains (e.g., reference numerals 24, 28, 78, 90, 112, and/or 186 above explained) and/or virtual machines 190, for example, may be reserved for software services 50 having a heavy, disproportionate, or abnormally large rate 220 of generation. Another of the blockchains and/or virtual machines 190 may be reserved for software services 50 having a medium, intermediate, or historically average rate 220 of generation. Another blockchain and/or virtual machine 190 may be reserved for the software services 50 having a light, low, or historically below average rate 220 of generation. The rate 220 of generation may thus be a gauge or measure of which blockchain, software service 50, and/or virtual machine 190 is assigned the resources.

Figure 23:
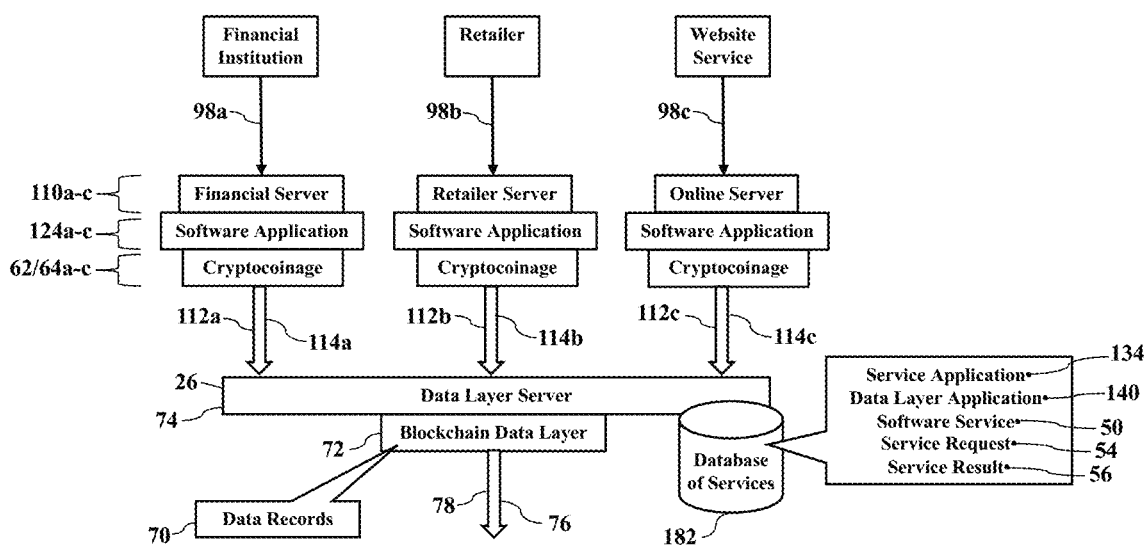
FIG. 23 illustrates a service environment, according to exemplary embodiments.

FIG. 23 illustrates a service environment, according to exemplary embodiments. Here exemplary embodiments may provide many different software services 50 to many different blockchains 24. Here the data layer server 74, for example, provides or manages the software services 50 while also generating the blockchain data layer 72 as still another service (such as the validation service 80 illustrated in FIGS. 5-6). The data layer server 74 may thus acts as a subcontractor or service provider, perhaps in a subscription or other compensation scheme. The financial server 110*a* may thus send or forward its private blockchain 112*a* (generated from its private data 98*a*) to the data layer server 74 for application or execution of any software service 50 (perhaps invoking the database 182 of services, as above explained). The data layer server 74 may generate the data records 70 of the blockchain data layer 72 that document the service result 56. Moreover, the data layer server 74 may publically publish the cryptographic proof 76 within the public blockchain 78, thus further documenting immutable evidence of the service result 56. The financial server 110*a* may also generate blocks 114*a* of data within the private blockchain 112*a* that also document the service request 54, the service result 56, and/or the software service 50. The financial server 110*a* may then pay or reward the data layer server 74 in exchange for the software service 50 and/or the data records 70 in the blockchain data layer 72 (such as granting its crytpocoinage 62\64).

The data layer server 74 may serve other blockchains. The retailer server 110*b* may send or forward its private blockchain 112*b* (generated from its private data 98*b*) to the data layer server 74 for application or execution of any software service 50. The online server 110*c* may also send or forward its private blockchain 112*c* (generated from its private data 98*c*) to the data layer server 74 for application or execution of any software service 50. The data layer server 74 may generate the data records 70 of the blockchain data layer 72 that document each service result 56, and the data layer server 74 may publically publish each cryptographic proof 76 within the public blockchain 78, thus further documenting immutable evidence of each service result 56. The retailer server 110*b* and the online server 110*c* may also generate their respective blocks 114*b-c* of data within their private blockchains 112*b-c* that also document each service request 54, service result 56, and/or software service 50. The retailer server 110*b* and the online server 110*c* may then pay or reward the data layer server 74 via their respective crytpocoinage 62\64*b-c*.

Exemplary embodiments thus describe elegant solutions. Blockchains may import data and export data in desired formats. Blockchains may offer and advertise software services 50, and blockchains may specialize in different software services and/or functions that perform or accomplish particular tasks. A marketplace may thus develop for vendors of different software services 50, perhaps accessible using a vendor-specific or service-specific software application that is downloaded or accessed via a web interface. Moreover, exemplary embodiments allow individual users and other private entities to create their own private blockchains using their private data 98 and restrict its distribution, if desired. Cryptographic publication provides a public witness via the anchor(s) 82 to the public blockchain 78. Exemplary embodiments thus provide importation and exportation schemes for hybrid two-way blockchain interactions and two-way ledgering for improved record keeping.

Figure 24:
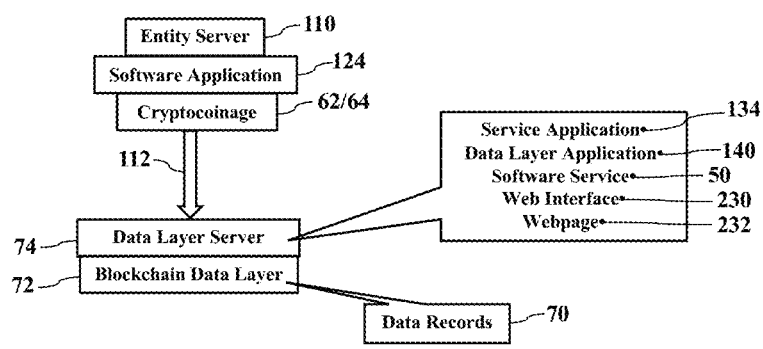
FIGS. 24-25 illustrate web access, according to exemplary embodiments.
Figure 25:
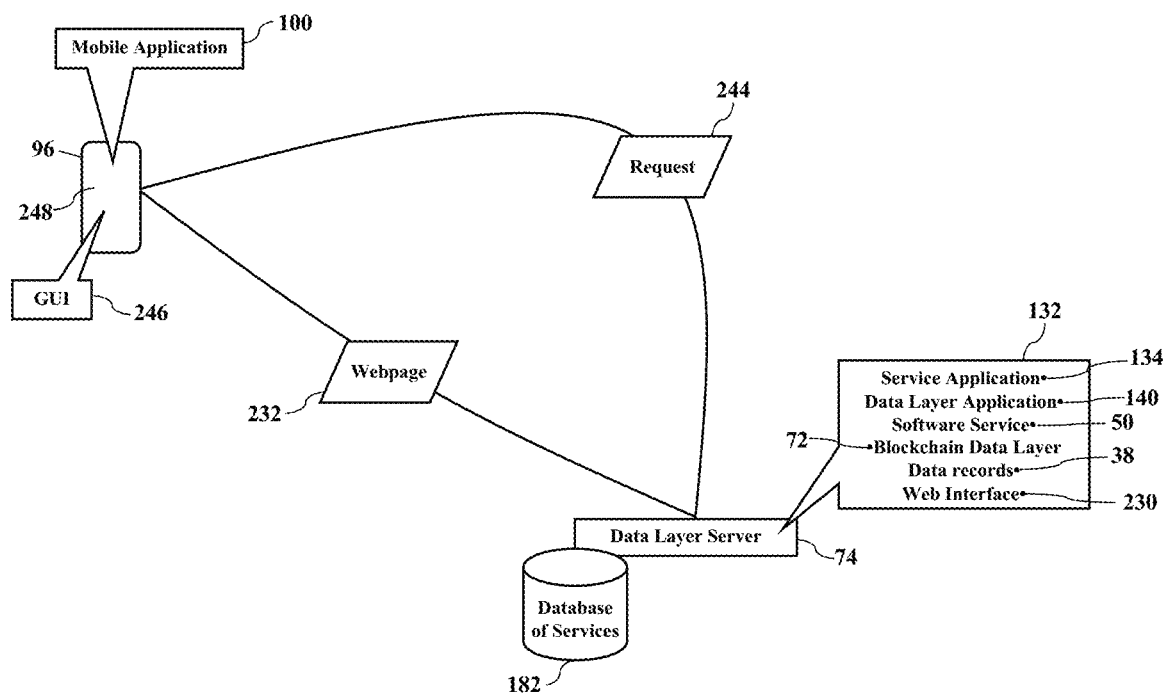

FIGS. 24-25 illustrate web access, according to exemplary embodiments. Here exemplary embodiments may be accessed and configured via the communications network 120 (such as the Internet, as illustrated with reference to FIGS. 9-11). FIG. 24 thus illustrates the service application 134 and/or the data layer application 140 as a software-as-a-service offered by the secure data layer server 74. A user may access the service application 134 and/or the data layer application 140 to define the various parameters governing the software service 50. While exemplary embodiments may have any access mechanism, FIG. 24 illustrates a web interface 230. That is, the service application 134 and/or the data layer application 140 may be accessed via a webpage 232. The webpage 232 prompts the user to input or to select one or more parameters governing the software service 50, the service application 134, and/or the data layer application 140.

FIG. 25 further illustrates the web interface 230. Again, as most readers are thought familiar with mobile computing, FIG. 25 again illustrates Mary's smartphone 96 executing the mobile application 100 (e.g., via its processor and memory device, not shown for simplicity). If the smartphone 96 correctly sends authentication credentials, then the smartphone 96 may utilize the web interface 230 to access the data layer server 74, the blockchain data layer 72, the service application 134, the data layer application 140, and/or the database 182 of services. The smartphone 96 executes a web browser and/or a mobile application to send a request 244 specifying an address or domain name associated with or representing the data layer server 74, the service application 134, and/or the data layer application 140. The web interface 230 to the data layer server 74 thus sends the webpage 232 as a response, and the user's smartphone 96 downloads the webpage 232. The smartphone 96 has a processor and memory device (not shown for simplicity) that causes a display of the webpage 232 as a graphical user interface (or "GUI") 246 on its display device 248. The GUI 246 may generate one or more prompts or fields for specifying the parameters defining the data layer server 74, the blockchain data layer 72, the service application 134, the data layer application 140, and/or the database 182 of services. As one example, the webpage 232 may have prompts or fields for specifying the entries in the electronic database 182 of services. Once the parameters or entries are specified, the software service 50 may commence operation.

Figure 26:
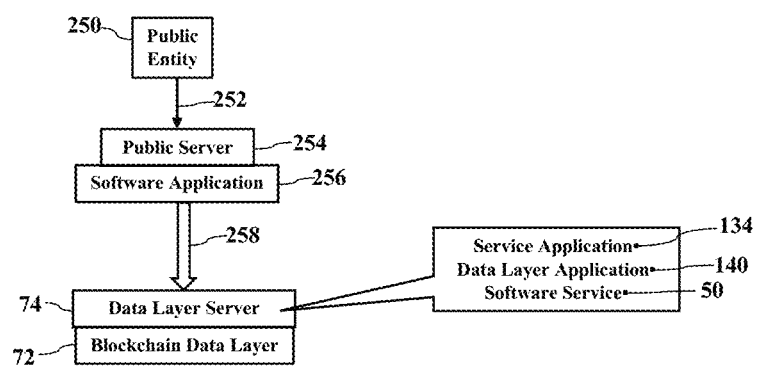
FIG. 26 illustrates a public entity, according to exemplary embodiments.

FIG. 26 illustrates a public entity 250, according to exemplary embodiments. Here exemplary embodiments may provide the software service 50 to any city, state, or federal governmental agency. Indeed, the public entity 250 may also be a contractor, non-governmental organization, or other actor that acts on behalf of the governmental agency. The public entity 250 operates its corresponding public server 254 and applies its software application 256 to its public data 252 to generate its governmental blockchain 258. The data layer server 74 receives the governmental blockchain 258 and generates the blockchain data layer 72. The data layer server 74 may also execute the service application 134 and/or the data layer application 140 to provide the software service 50, as this disclosure explains.

Figure 27:
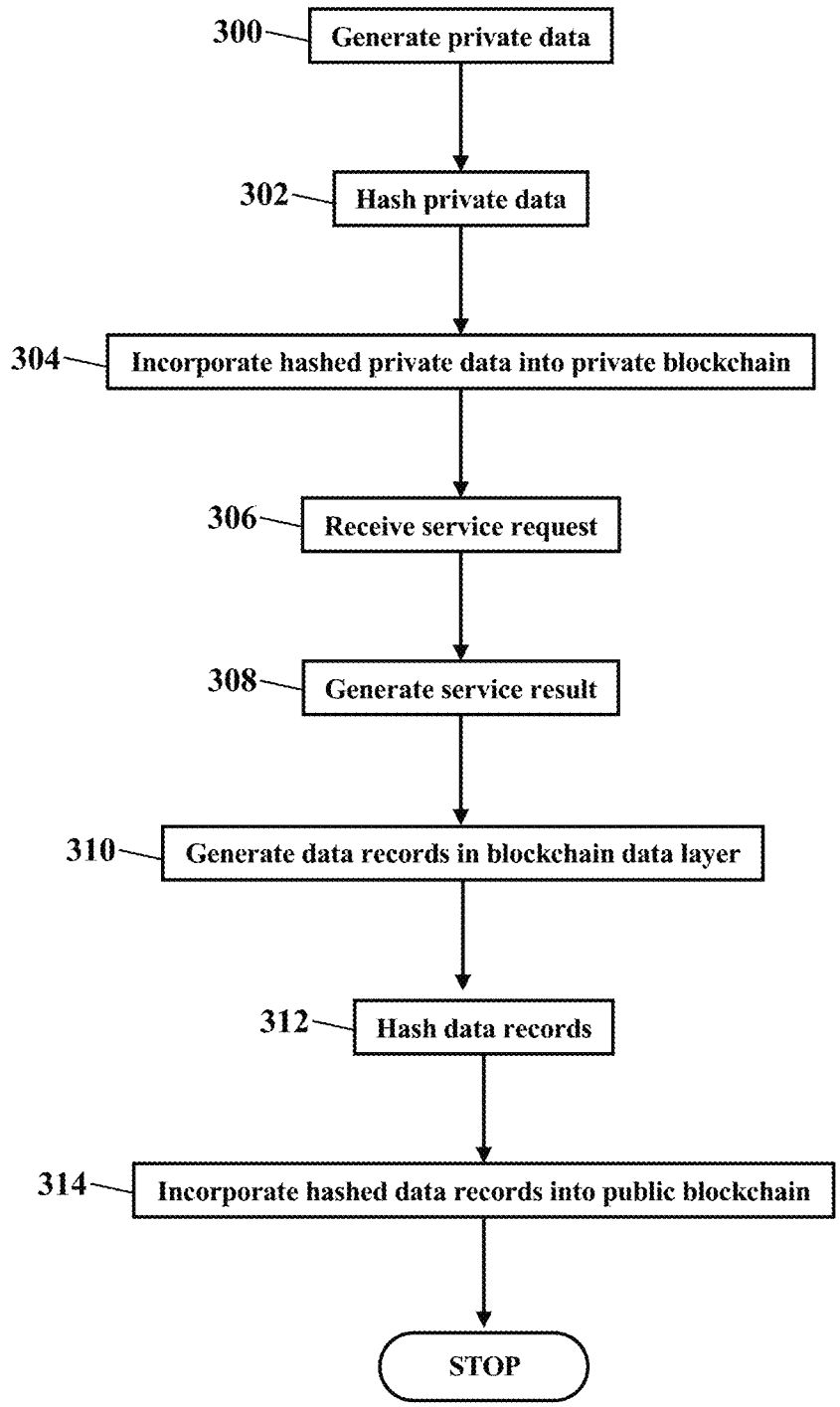
FIG. 27 is a flowchart illustrating a method or algorithm for service processing, according to exemplary embodiments.

FIG. 27 is a flowchart illustrating a method or algorithm for service processing, according to exemplary embodiments. The electronic private data 98 is generated (Block 300), hashed (Block 302), and incorporated into the private blockchain 112 (Block 304). The service request 54 is received by the data layer server 74 (Block 306) and the service result 56 is generated (Block 308). The data records 70 in the blockchain data layer 72 are generated (Block 310). The data records 70 in the blockchain data layer 72 may be hashed (Block 312) and incorporated into the public blockchain 78 (Block 314), thus documenting the service request 54, the service result 56, and the software service 50.

Figure 28:
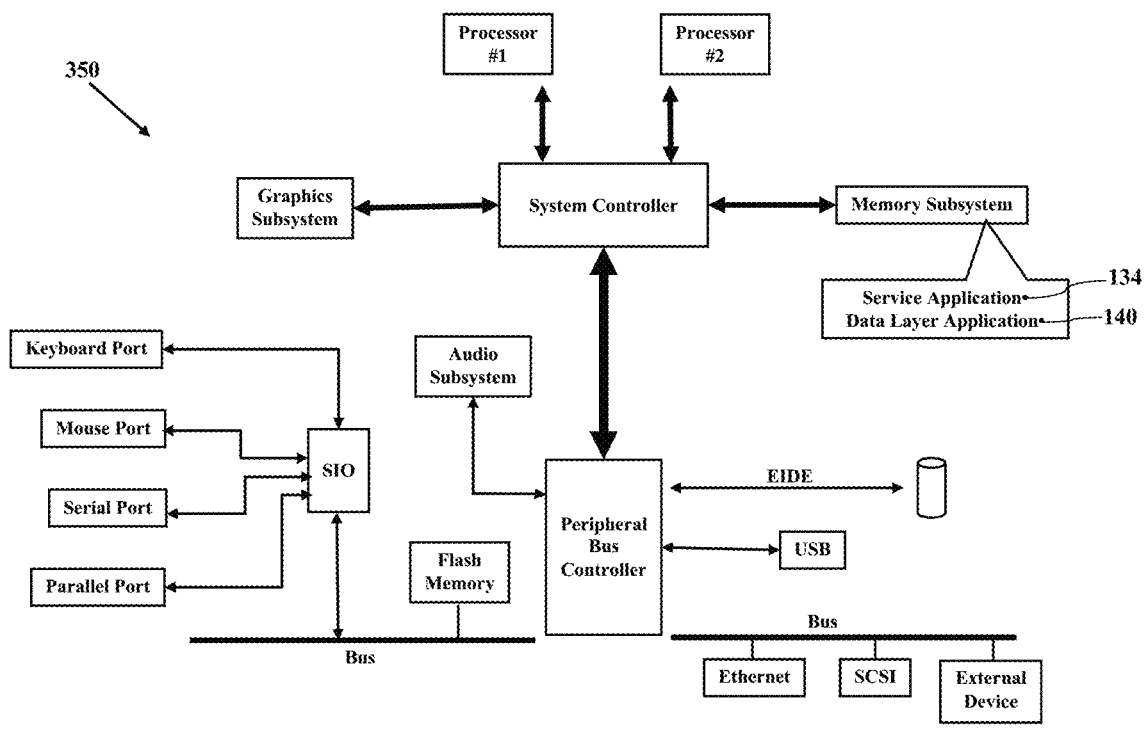
FIGS. 28-29 depict still more operating environments for additional aspects of the exemplary embodiments.

FIG. 28 is a schematic illustrating still more exemplary embodiments. FIG. 28 is a more detailed diagram illustrating a processor-controlled device 350. As earlier paragraphs explained, the service application 134 and/or the data layer application 140 may partially or entirely operate in any mobile or stationary processor-controlled device. FIG. 28, then, illustrates the service application 134 and/or the data layer application 140 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 29:
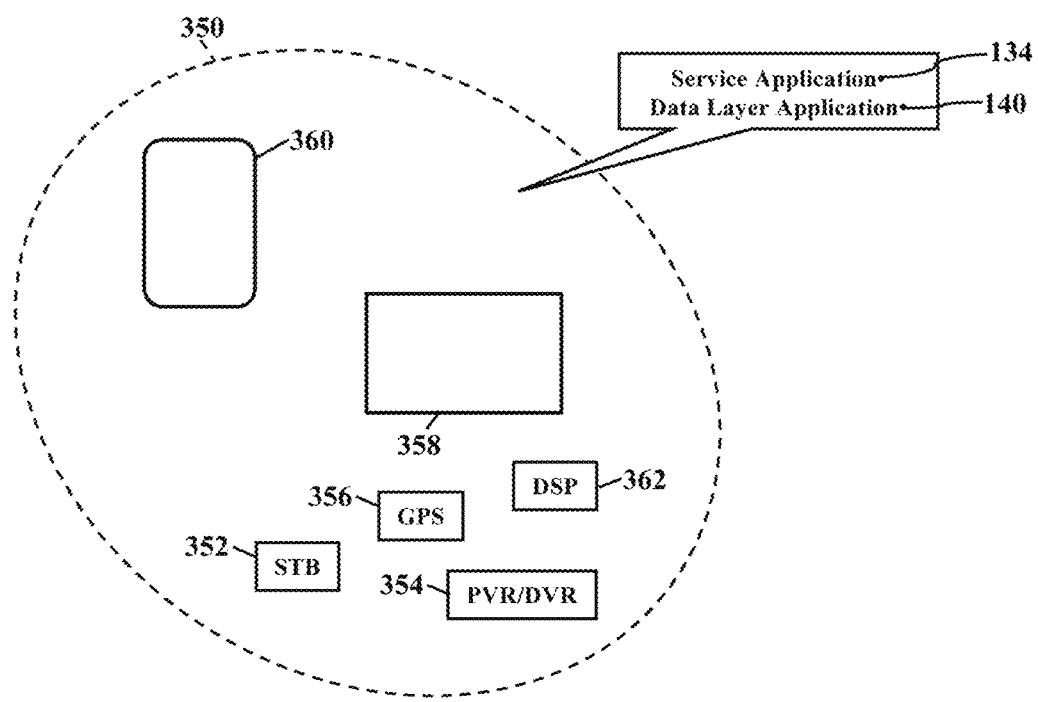

FIG. 29 depicts other possible operating environments for additional aspects of the exemplary embodiments. FIG. 29 illustrates the service application 134 and/or the data layer application 140 operating within various other processor-controlled devices 350. FIG. 29, for example, illustrates that the entity's private software application 126 and/or the data layer application 140 may entirely or partially operate within a set-top box ("STB") (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, clocks, printers, gateways, mobile implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for service processing in blockchain environments, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:
1. A method comprising:
receiving, by a server, a first blockchain providing a first software service and specifying a service identifier;
querying, by the server, an electronic database for the service identifier, the electronic database associating the service identifier to a second software service provided by a different, blockchain, the second software service being different from the first software service;

importing, by the server, an input data from the first blockchain;

sending, by the server, the input data to the second blockchain for performing the second software service.

2. The method of claim 1, further comprising generating a result of the second software service.

3. The method of claim 1, further comprising sending a result of the second software service to the first blockchain.

4. The method of claim 3, further comprising recording the result of the second software service on the first blockchain.

5. The method of claim 1, further comprising transacting, by the server, a compensation.

6. The method of claim 1, further comprising formatting the input data.

7. The method of claim 1, further comprising recording, by the server, the step of sending of the input data to the different blockchain.

8. A system in a blockchain environment, the system comprising:

a hardware processor; and a memory device storing instructions that, when executed by the hardware processor, perform operations comprising:

receiving a first blockchain providing a first software service and specifying a service identifier;

querying an electronic database for the service identifier, the electronic database associating the service identifier to a second software service provided by a different blockchain, the second software service being different from the first software service;

importing an input data from the first blockchain;

sending the input data to the second blockchain for performing the second software service.

9. The system of claim 8, wherein the operations further comprise generating a result of the second software service.

10. The system of claim 8, wherein the operations further comprise sending a result of the second software service to the first blockchain.

11. The system of claim 10, wherein the operations further comprise recording the result of the second software service on the first blockchain.

12. The system of claim 8, wherein the operations further comprise transacting, by the server, a compensation.

13. The system of claim 8, wherein the operations further comprise formatting the input data.

14. The system of claim 8, wherein the operations further comprise recording, by the server, the step of sending of the input data to the different blockchain.

15. A memory device storing instructions that, when executed by a hardware processor, perform operations, comprising:

receiving a first blockchain providing a first software service and specifying a service identifier;

querying an electronic database for the service identifier, the electronic database associating the service identifier to a second software service provided by a different, blockchain, the second software service being different from the first software service;

importing an input data from the first blockchain;

sending the input data to the second blockchain for performing the second software service.

16. The system of claim 15, wherein the operations further comprise generating a result of the second software service.

17. The system of claim 16, wherein the operations further comprise recording the result of the second software service on the first blockchain.

18. The system of claim 15, wherein the operations further comprise transacting, by the server, a compensation.

19. The system of claim 15, wherein the operations further comprise formatting the input data.

20. The system of claim 15, wherein the operations further comprise recording, by the server, the step of sending of the input data to the different blockchain.

* * * * *